United States Patent
Matsuda et al.

(10) Patent No.: US 7,430,634 B2
(45) Date of Patent: Sep. 30, 2008

(54) DATA TRANSFER APPARATUS AND DATA TRANSFER METHOD

(75) Inventors: Shinnosuke Matsuda, Kawasaki (JP); Nina Arataki, Kawasaki (JP); Sadayuki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/339,612

(22) Filed: Jan. 26, 2006

(65) Prior Publication Data

US 2006/0129707 A1    Jun. 15, 2006

Related U.S. Application Data

(63) Continuation-in-part of application No. 11/089,350, filed on Mar. 25, 2005, now abandoned.

(30) Foreign Application Priority Data

Dec. 10, 2004 (JP) .............................. 2004-358141
Nov. 18, 2005 (JP) .............................. 2005-334713

(51) Int. Cl.
  *G06F 12/00* (2006.01)
(52) U.S. Cl. .............................. 711/112; 710/22; 710/52
(58) Field of Classification Search .................. 711/112
  See application file for complete search history.

(56) References Cited

U.S. PATENT DOCUMENTS

| | | | | |
|---|---|---|---|---|
| 6,253,283 B1 * | 6/2001 | Yamamoto | ................. | 711/114 |
| 6,487,632 B1 * | 11/2002 | Nakatani | ................. | 711/112 |
| 6,904,473 B1 * | 6/2005 | Bloxham et al. | .............. | 710/22 |
| 2002/0062409 A1 * | 5/2002 | Lasserre et al. | ............... | 710/22 |
| 2003/0088732 A1 * | 5/2003 | Tadroda et al. | .............. | 711/112 |

FOREIGN PATENT DOCUMENTS

| | | |
|---|---|---|
| JP | 63-727 | 1/1988 |
| JP | 5-35656 | 2/1993 |
| JP | 5-128050 | 5/1993 |
| JP | 5-165725 | 7/1993 |
| JP | 8-287003 | 11/1996 |
| JP | 2005-513594 | 5/2005 |
| WO | 03/050655 | 6/2003 |

* cited by examiner

*Primary Examiner*—Kevin Ellis
*Assistant Examiner*—Hashem Farrokh
(74) *Attorney, Agent, or Firm*—Staas & Halsey LLP

(57) ABSTRACT

A data transfer apparatus receives comparison data to be compared with stored data from an external unit, searches data corresponding to the comparison data from among the stored data, and transfers the searched data to the external unit. A control unit generates comparison-condition information for searching predetermined stored data from a data storing memory. A comparison-data storing unit stores the received comparison data. A comparison-condition storing unit stores the generated comparison-condition information. A transfer processing unit transfers the searched stored-data to the external unit.

18 Claims, 17 Drawing Sheets

FIG.13

DESCRIPTOR BLOCK 0

| | START FLAG | LAST FLAG | TAG NUMBER |
|---|---|---|---|
| DESCRIPTOR 0 | 1 | 0 | 0 |
| DESCRIPTOR 1 | 0 | 0 | 0 |
| DESCRIPTOR 2 | 0 | 1 | 0 |

DESCRIPTOR BLOCK 1

| | START FLAG | LAST FLAG | TAG NUMBER |
|---|---|---|---|
| DESCRIPTOR 0 | 1 | 0 | 1 |
| DESCRIPTOR 1 | 0 | 0 | 1 |
| DESCRIPTOR 2 | 0 | 1 | 1 |

DESCRIPTOR BLOCK 2

| | START FLAG | LAST FLAG | TAG NUMBER |
|---|---|---|---|
| DESCRIPTOR 0 | 1 | 0 | 2 |
| DESCRIPTOR 1 | 0 | 0 | 2 |
| DESCRIPTOR 2 | 0 | 1 | 2 |

DESCRIPTOR BLOCK 3

| | START FLAG | LAST FLAG | TAG NUMBER |
|---|---|---|---|
| DESCRIPTOR 0 | 1 | 0 | 3 |
| DESCRIPTOR 1 | 0 | 0 | 3 |
| DESCRIPTOR 2 | 0 | 1 | 3 |

⋮

| TAG NUMBER | HIT FLAG | ERROR FLAG | LAST FLAG | VALID FLAG |
|---|---|---|---|---|
| 0 | 1 | 0 | 1 | 0 |
| 1 | 0 | 1 | 1 | 0 |
| 2 | 1 | 0 | 0 | 1 |
| 3 | 0 | 0 | 0 | 0 |

FIG.17
| TAG NUMBER | HIT FLAG | ERROR FLAG | LAST FLAG | VALID FLAG |
|---|---|---|---|---|
| 0 | 1 | 0 | 1 | 1 |
| 1 | 0 | 0 | 0 | 0 |
| 2 | 0 | 0 | 0 | 0 |
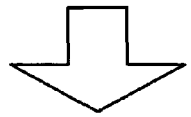
| TAG NUMBER | HIT FLAG | ERROR FLAG | LAST FLAG | VALID FLAG |
|---|---|---|---|---|
| 0 | 1 | 0 | 1 | 1 |
| 1 | 1 | 0 | 0 | 1 |
| 2 | 0 | 0 | 0 | 0 |
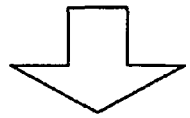
| TAG NUMBER | HIT FLAG | ERROR FLAG | LAST FLAG | VALID FLAG |
|---|---|---|---|---|
| 0 | 1 | 0 | 1 | 0 |
| 1 | 1 | 0 | 0 | 1 |
| 2 | 0 | 1 | 1 | 1 |

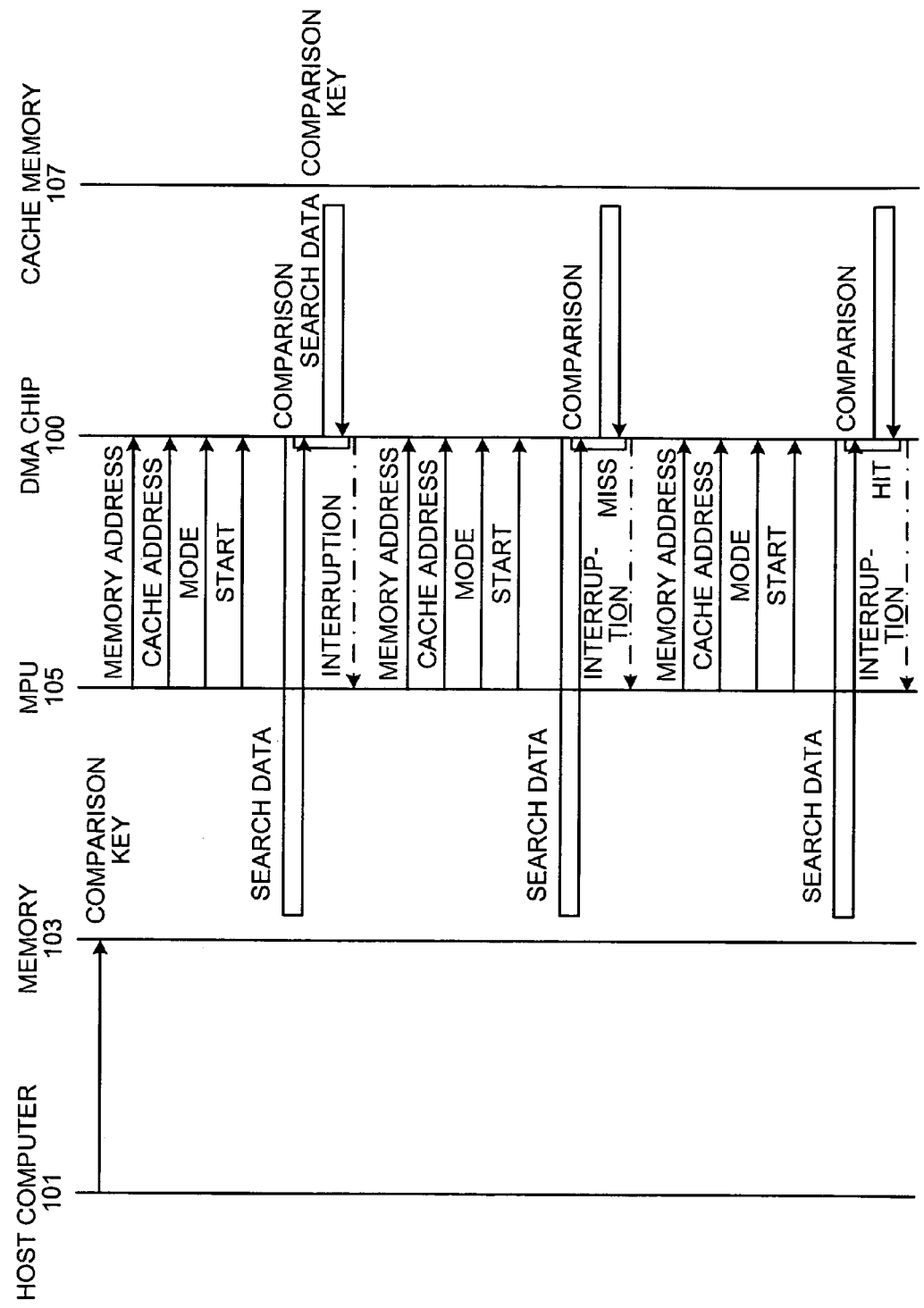

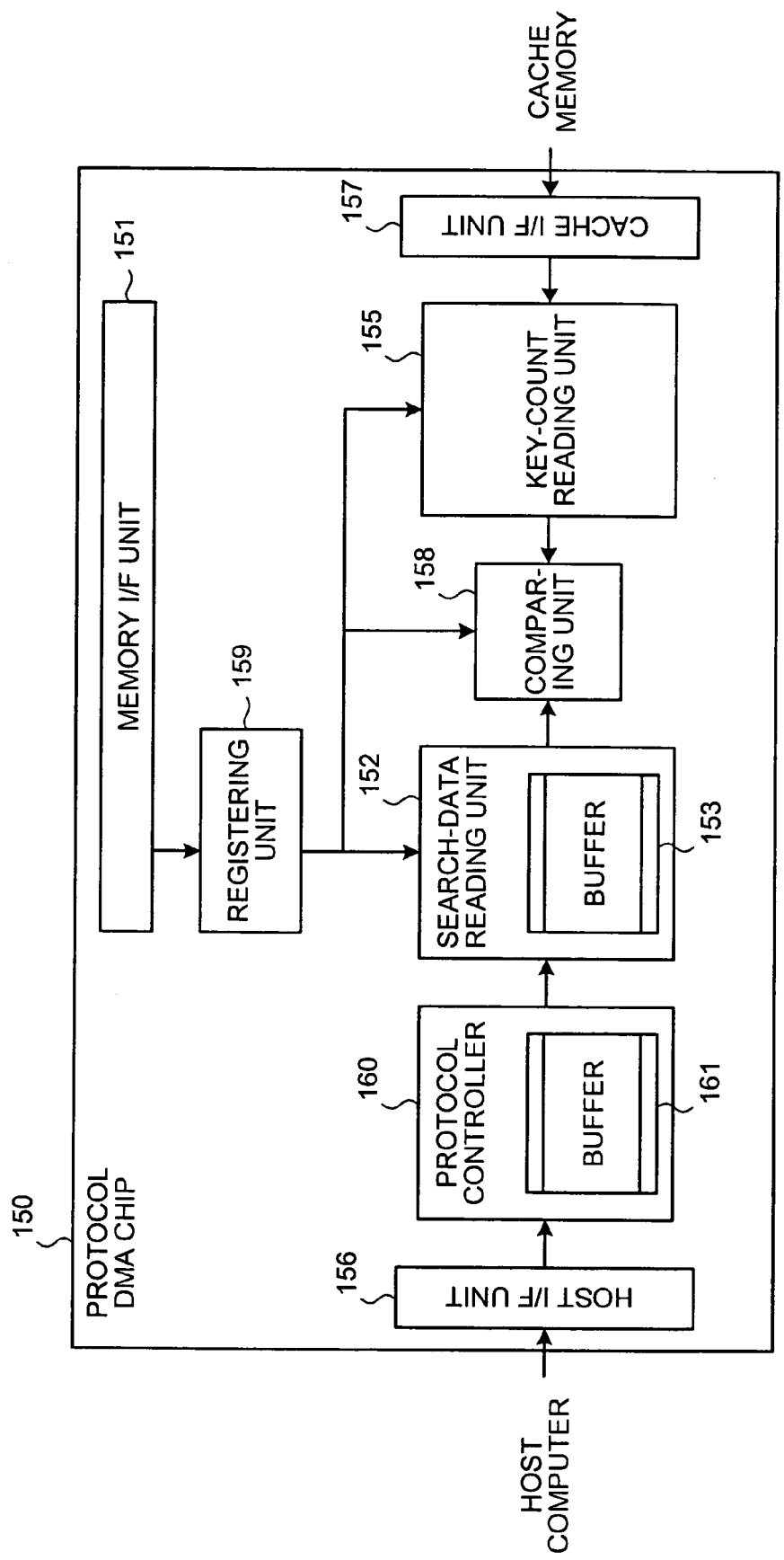

DATA TRANSFER APPARATUS AND DATA TRANSFER METHOD

This application is a continuation-in-part application based on U.S. patent application Ser. No. 11/089,350, filed Mar. 25, 2005, now abandoned it being further noted that priority is based upon Japanese Application numbers 2004-358141 & 2005-334713, filed Dec. 10, 2004 & Nov. 18, 2005, respectively.

BACKGROUND OF THE INVENTION

1. Field of the Invention

The present invention relates to a technology for searching data in a computer system and performing a direct-memory-access (DMA) transfer of the data.

2. Description of the Related Art

In recent years, there has been a rapid progress in development of a technology for improving a performance of computer systems. For example, an efficient transfer of data between memories in a computer system and between a memory and an I/O device has been sought after.

A DMA is one of the methods for an efficient transfer of data. In the DMA, instead of a central processing unit (CPU) that performs the data transfer in the computer system, a DMA circuit that is used as a dedicated hardware that performs the data transfer in the computer system based on a command from the CPU.

FIG. 18 is a block diagram of a DMA chip according to a conventional technology. A DMA chip 100 is used in components such as a channel adapter in a disc array unit and includes a memory I/F unit 91 that is connected to a memory (storing a command from a micro processing unit (MPU) in the channel adapter) and a cache I/F unit 97 that is connected to a cache memory (storing data that is searched) on a disc array side.

A registering unit 99 receives instructions (commands) from the MPU in the channel adapter by register writing, provides a memory address and data length etc. as necessary information in a descriptor to a search-data reading unit 92, and provides a cache address and data length etc. as necessary information in the descriptor, to a key-count reading unit 95.

The search-data reading unit 92 reads search data from a comparison-data length from the memory address that is designated to a register and the key-count reading unit 95 reads data of a key unit or a count unit of the comparison-data length from the cache address that is designated to the register. The key-count reading unit 95, when receives search data from the cache memory via the cache I/F unit 97, reads search data from a buffer 93 of the search-data reading unit 92 and compares the respective search data. Then, the key-count reading unit 95 makes a judgment of whether a result of comparison satisfies (Hit) a comparing condition of the search data or not (Miss), as well as interrupts the MPU with each comparison (data search etc.).

FIG. 19 is a sequence diagram of a processing procedure for a data search process according to the conventional technology. The comparison data (comparison key) for performing search of data that is sent from a host computer 101 is stored in a memory 103 of the channel adapter. Data search is started upon setting by register a memory address, a cache address, and a mode etc. to the DMA chip 100 from an MPU 105 in the channel adapter.

The DMA chip 100 receives the search data (comparison key) respectively from the memory 103 and a cache memory 107 on the disc array side, based on the memory address and the cache address that are designated by the MPU 105, and then compares the respective search data.

When a result of comparison of the search data is "Miss", the DMA chip 100 interrupts the MPU 105. Then, the MPU 105 once again performs register setting in the DMA chip 100 so that the DMA chip 100 performs the next comparison, and performs a key search (comparison of search data). The key search is performed repeatedly till the result of comparison of the search data is "Hit". When the result of the comparison of the search data becomes "Hit", the DMA chip 100 interrupts the MPU 105 and stops comparison of data by the DMA chip 100.

Thus, in a search operation by the DMA chip 100, if the comparison of the search data does not match with the comparison condition by comparing once, the MPU 105 is required to give instructions to the DMA chip 100 for the next comparison of the search data.

However, sometimes a transmission speed of a bus (data-transmission path) that receives data from a host computer in the DMA chip differs from a transmission speed of a bus that receives data from the cache memory.

FIG. 20 is a block diagram of a protocol DMA chip according to the conventional technology. A protocol DMA chip 150 has a function of a protocol chip that controls a protocol in a communication with a host computer (not shown) and a function of a DMA chip that includes the DMA circuit.

The protocol DMA chip 150 includes a host (personal computer) I/F unit 156, a protocol control unit 160, a cache I/F unit 157, and a memory I/F unit 151. The host I/F unit 156 is connected to the host computer. The protocol control unit 160 includes a buffer 161 that stores temporarily search data from the host computer (MPU in the channel adapter). The cache I/F unit 157 is connected to a cache memory on the disc array side.

In the protocol DMA chip 150 shown in FIG. 20, the search data (such as memory address and data length) from the host computer is transmitted to a search-data reading unit 152 without being passed through a registering unit 159. A comparing unit 58 compares search data stored by the search-data reading unit 152 and search data (key) that is transmitted via a key-count reading unit 155 from the cache memory.

In the protocol DMA chip 150, key etc. from the cache memory cannot be read till all the search data stored in the buffer 161 in the protocol control unit 160 is stored in a buffer 153 in the search-data reading unit 152.

While comparing the data, it is necessary that the next transmission (data reception) is performed after a bus with a high transmission-speed of data (such as a peripheral-component-interconnect (PCI) bus that connects the cache I/F unit 157 and the key-count reading unit 155), waits for a processing by a bus with a low transmission-speed of data (such as a bus that connects the protocol control unit 160 and the search-data reading unit 152), which affects an efficiency of data transfer.

An asynchronous file controlling unit that has been disclosed in Japanese Patent Application Laid-open Publication No. H5-165725 performs a cache control by a cache mechanism and an asynchronous file control of a device. The asynchronous file controlling unit includes a buffer for data transfer that stores temporarily transfer data and a comparison circuit that compares the transfer data. A register that can supply from the buffer for data transfer data to the comparing circuit independently apart from a normal route of data transfer is provided. A data transfer to the normal route of data transfer is performed as well during a comparison operation by the comparing circuit.

However, according to the conventional technology, if the comparison of the search data does not match with comparison conditions, the search data cannot be compared by suppressing an overhead of the MPU.

SUMMARY OF THE INVENTION

It is an object of the present invention to at least solve the problems in the conventional technology.

A data transfer apparatus according to one aspect of the present invention is connected to a data storing memory that stores a plurality of data as a plurality of stored data. The data transfer apparatus receives comparison data to be compared with the stored data from an external unit, searches data corresponding to the comparison data from among the stored data, and transfers the searched stored-data to the external unit. The data transfer apparatus includes a control unit that controls the entire data transfer apparatus, and generates a plurality of pieces of comparison-condition information for searching predetermined stored data from the data storing memory; a comparison-data storing unit that stores the comparison data received; a comparison-condition storing unit that stores the comparison-condition information generated, upon the comparison-data storing unit storing the comparison data; and a transfer processing unit that transfers the searched stored-data to the external unit. The transfer processing unit includes an information extracting function of reading the comparison-condition information stored one by one, and extracting, from the comparison-condition information read, comparison-data reading information for reading the comparison data from the comparison-data storing unit and stored-data reading information for reading the stored data from the data storing memory, a comparison-data reading function of reading the comparison data from the comparison-data storing unit based on the comparison-data reading information extracted, a stored-data reading function of reading the stored data from the data storing memory based on the stored-data reading information extracted, and a stored-data searching function of searching the stored data corresponding to the comparison-condition information and the comparison data by comparing the stored data read with the comparison data read based on the comparison-condition information.

A data transfer apparatus according to another aspect of the present invention is connected to a data storing memory that stores a plurality of data as a plurality of stored data. The data transfer apparatus receives comparison data to be compared with the stored data from an external unit, searches data corresponding to the comparison data from among the stored data, and transfers the searched stored-data to the external unit. The data transfer apparatus includes a comparison-data storing unit that stores the comparison data received; a control unit that controls the entire data transfer apparatus, and generates comparison-condition information for comparing the stored data with the comparison data; a transfer processing unit that transfers the searched stored-data to the external unit. The transfer processing unit includes a comparison-data reading function of reading the comparison data from the comparison-data storing unit based on the comparison-data reading information, a stored-data reading function of reading the stored data from the data storing memory based on the comparison-condition information, and a stored-data searching function of searching the stored data corresponding to the comparison-condition information and the comparison data by comparing the stored data read with the comparison data read based on the comparison-condition information. The comparison-data reading function includes a comparison-data storing buffer that reads the comparison data from the comparison-data storing unit, temporarily stores the comparison data read, and when the comparison data temporarily stored is read by the stored-data searching function, reads next comparison data from the comparison-data storing unit, and temporarily stores the next comparison data read. The stored-data reading function includes a stored-data storing buffer that reads the stored data from the stored-data storing unit, temporarily stores the stored data read, and when the stored data temporarily stored is read by the stored-data searching function, reads next stored data from the stored-data storing unit, and temporarily stores the next stored data read.

A data transfer method according to still another aspect of the present invention is for a data transfer apparatus that is connected to a data storing memory that stores a plurality of data as a plurality of stored data. The data transfer apparatus receives comparison data to be compared with the stored data from an external unit, searches data corresponding to the comparison data from among the stored data, and transfers the searched stored-data to the external unit. The data transfer method includes generating a plurality of pieces of comparison-condition information for searching predetermined stored data from the data storing memory; storing the comparison data received in a first memory; storing the comparison-condition information in a second memory upon the comparison data being stored in the first memory; reading the comparison-condition information stored in the second memory one by one; extracting comparison-data reading information for reading the comparison data from the first memory and stored-data reading information for reading the stored data from the data storing memory from the comparison-condition information; reading the comparison data from the first memory based on the comparison-data reading information; reading the stored data from the data storing memory based on the stored-data reading information; searching the stored data corresponding to the comparison-condition information and the comparison data by comparing the stored data read with the comparison data read based on the comparison-condition information; and transferring the searched stored-data to the external unit.

A data transfer method according to still another aspect of the present invention is for a data transfer apparatus that is connected to a data storing memory that stores a plurality of data as a plurality of stored data. The data transfer apparatus receives comparison data to be compared with the stored data from an external unit, searches data corresponding to the comparison data from among the stored data, and transfers the searched stored-data to the external unit. The data transfer method includes storing the comparison data received in a comparison-data storing memory; generating comparison-condition information for comparing the stored data with the comparison data; reading the comparison data from a comparison-data memory based on the comparison-data reading information; reading the stored data from the data storing memory based on the comparison-condition information; searching the stored data corresponding to the comparison-condition information and the comparison data by comparing the stored data read with the comparison data read based on the comparison-condition information; and transferring the searched stored-data to the external unit. The reading the comparison-data includes reading the comparison data from the comparison-data memory; storing temporarily the comparison data read in a first buffer; reading, when the comparison data temporarily stored is read, next comparison data from the comparison-data memory; and storing temporarily the next comparison data read in the first buffer. The reading the stored data includes reading the stored data from the stored-data memory; storing temporarily the stored data read in a second buffer; reading, when the stored data temporarily stored is read, next stored data from the stored-data memory; and storing temporarily the next stored data read in the second buffer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic for illustrating a descriptor block;

FIG. 17 is a schematic for illustrating an update of the tag table;

FIG. 19 is a sequence diagram of a processing procedure for a data search process according to the conventional technology; and FIG. 20 is a block diagram of a protocol DMA chip according to the conventional technology.

DETAILED DESCRIPTION OF THE PREFERRED EMBODIMENTS

Exemplary embodiments of a data transfer apparatus and a data transfer method according to the present invention are explained in detail below with reference to the accompanying drawings. However, the present invention is not restricted to these embodiments.

Figure 1:
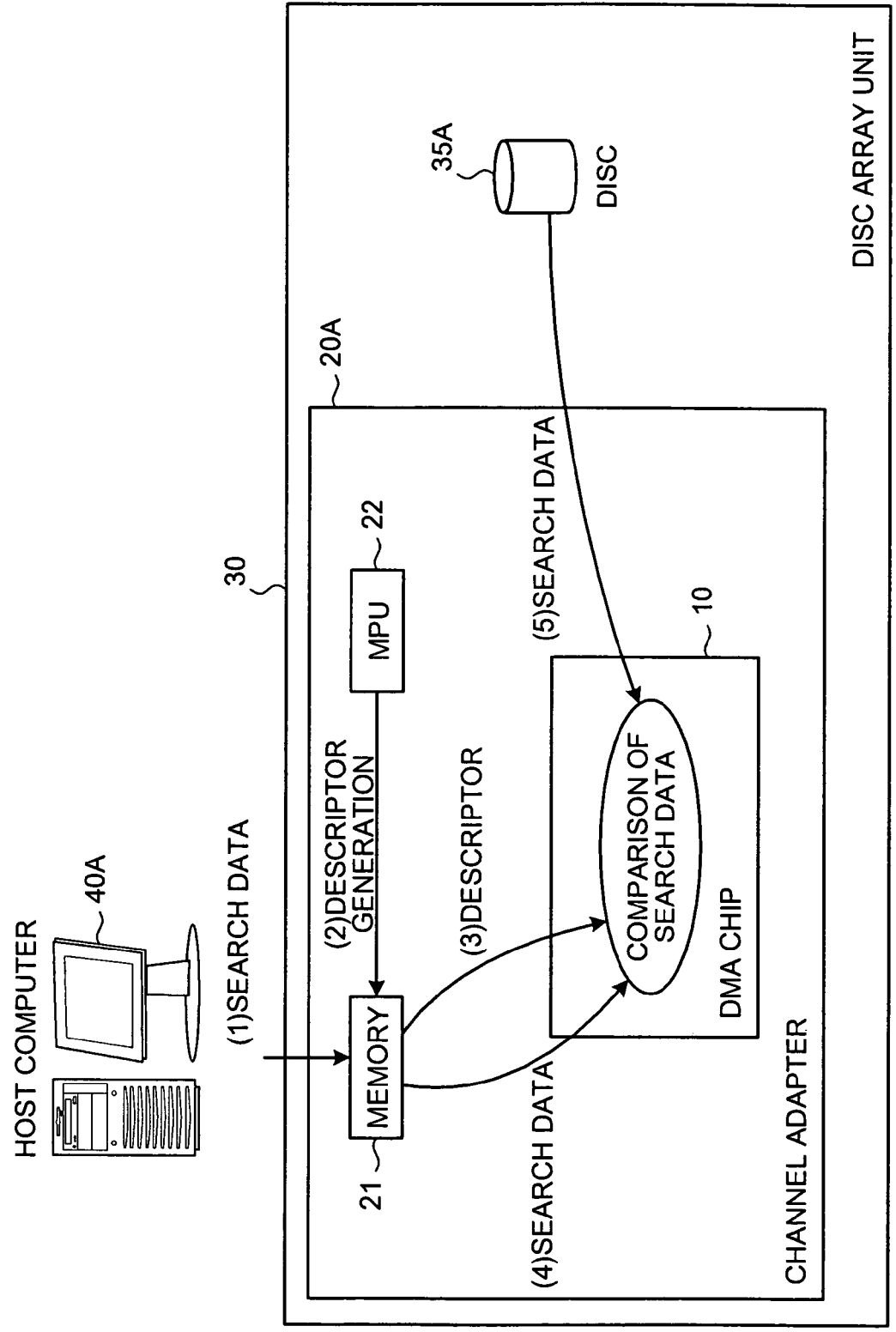
FIG. 1 is a schematic for illustrating a concept of a DMA control according to a first embodiment of the present invention.

FIG. 1 is a schematic for illustrating a concept of a DMA control according to a first embodiment of the present invention. A disc array unit 30 performs search of data in the disc array unit 30, based on instruction-information that is transmitted from a host computer (external unit) 40A, and provides data that is searched to the host computer 40A.

According to the first embodiment, search data for data search that is transmitted from the host computer 40A is stored in a memory 21 of a channel adapter (data transfer apparatus) 20A. An MPU 22 generates a plurality of requests as a descriptor (information of conditions for comparison for performing data search) in the memory 21. A DMA chip 10 that transfers DMA in the channel adapter 20A reads descriptors (a series of information) in the memory 21 one by one, and based on the descriptors read, compares the search data (comparison data) in the memory 21 and search data from a disc 35A. Data that is searched by the DMA chip 10 is transferred to the host computer 40A.

Figure 2:
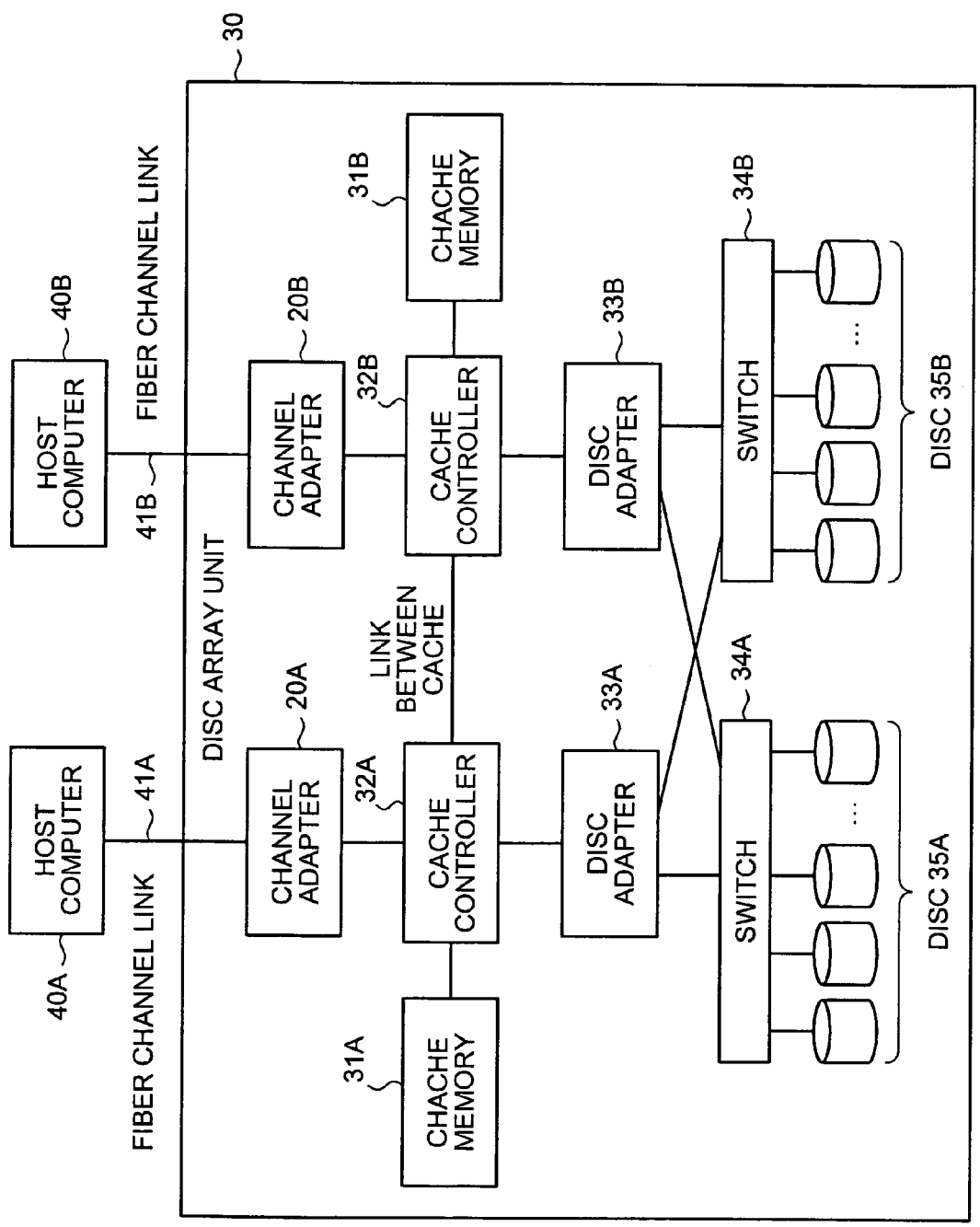
FIG. 2 is a block diagram of a disc array unit according to the first embodiment.

FIG. 2 is a block diagram of the disc array unit 30 according to the first embodiment. The disc array unit 30 is an example of a computer system in which a DMA (the DMA chip 10) that includes a DMA control circuit is used. The disc array unit 30 is connected to the host computer 40A and a host computer 40B. The disc array unit 30 is a unit such as a personal computer that searches data in the disc array unit 30 based on instruction-information that is transmitted from the host computers 40A and 40B, and provides the data searched to the host computers 40A and 40B.

The disc array unit 30 has a redundant-arrays-of-independent-disks (RAID) for writing at a high speed a large amount of data, by combining a plurality of discs (data storing memory) 35A and 35B.

The disc array unit 30 includes channel adapters 20A and 20B, cache memories 31A and 31B, cache control units 32A and 32B, disc adapters 33A and 33B, switches 34A and 34B, and discs 35A and 35B.

Since each of the channel adapters 20A and 20B have similar functions, each of the cache memories 31A and 31B have similar functions, each of the cache control units 32A and 32B have similar functions, each of the disc adapters 33A and 33B have similar functions, each of the switches 34A and 34B have similar functions, and each of the discs 35A and 35B have similar functions, the channel adapter 20A, a cache memory 31A, the cache control unit 32A, the disc adapter 33A, the switch 34A and the disc 35A are described below.

The channel adapter 20A has a function of a communication interface that transmits and receives data to and from the host computer 40A, and includes the DMA chip 10 that transfers the DMA. The cache memory 31A stores temporarily data of the disc 35A that stores a plurality of data. The cache control unit 32A performs management and control of the cache memory 31A. The disc adapter 33A has a communication interface that transmits and receives data to and from the disc 35A. The switch 34A connects a plurality of the discs 35A and switches a connection of each disc and the disc adapter 33A. The disc 35A includes a plurality of discs and is controlled by a disc drive (not shown in the diagram). The disc 35A stores a plurality of data that is subjected to transfer (search).

When the channel adapter 20A receives a request for reading data from the host computer 40A, it checks if a predetermined data specified by the host computer 40A exists in the cache memory 31A.

If the data specified by the host computer is there in the cache memory 31A, the cache memory 31A notifies the channel adapter 20A a possibility of reading the data. The channel adapter 20A reads the data that can be read from the cache memory 31 and transfers it to the host computer 40A.

On the other hand, if the data specified by the host computer 40A is not there in the cache memory 31A, the cache memory 31A reads data from the disc 35A that stores the predetermined data specified by the host computer via the disc adapter 33A and the switch 34A, and stores (staging) it in the cache memory 31A. After this, the cache memory 31A notifies the channel adapter 20A of a possibility of reading the data. The channel adapter 20A reads the data that can be read from the cache memory 31A and stores it in the host computer 40A. Thus, since the disc array unit 30 is provided with the cache memory 31A, an access time of data from the channel adapter 20A can be shortened.

The host computer is not restricted to a combination of the host computers 40A and 40B and may be one host computer or a combination of more than two host computers. Moreover, the configuration of the disc array unit 30 is not restricted to the configuration that includes two channel adapters and may be a configuration that includes one channel adapter or more than two channel adapters.

Figure 3:
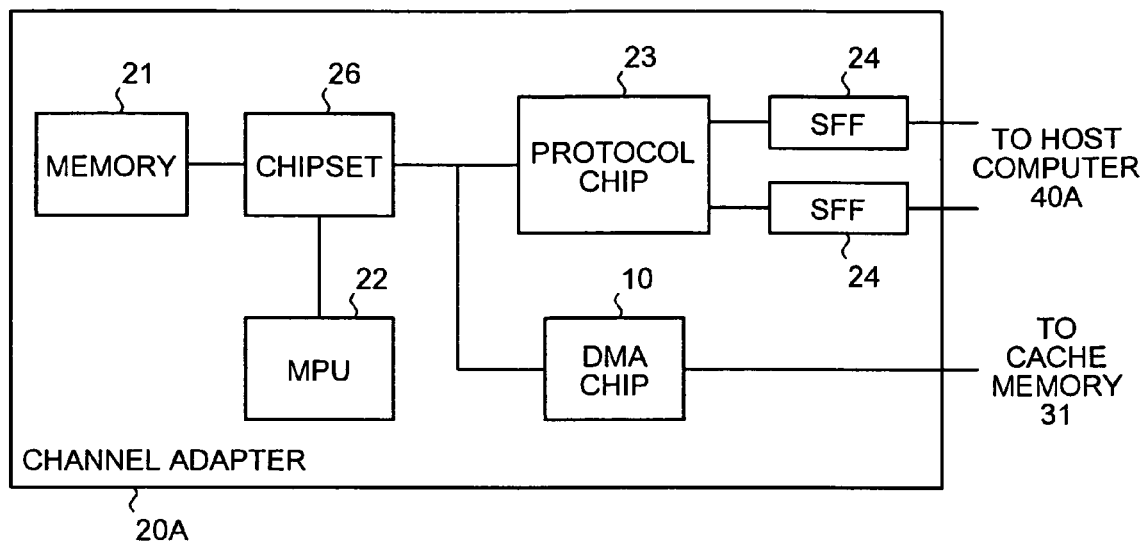
FIG. 3 is a block diagram of an example of a channel adapter according to the first embodiment.

FIG. 3 is a block diagram of an example of the channel adapter 20A according to the first embodiment. The channel adapter 20A includes the memory 21 the MPU (control unit) 22, a chipset 26, a protocol chip 23, a small form factor (SFF) 24, and the DMA chip (transfer processing unit) 10. The memory 21 is a comparison-data storing unit (first memory, comparison-data memory), comparison-condition storing unit (second memory).

The protocol chip 23 is a large-scale integrated-circuit (LSI) for controlling a protocol of a fiber channel (fiber channel link 41A) that is used in connection with the host computer 40A. The disc array unit 30 and the host computer 40A are connected by connecting the protocol chip 23 and the host computer 40 by an optical cable. The SFF 24 is a module that performs electro-optical conversion.

The MPU 22 is a processor (LSI) that controls the channel adapter 20A and the chipset 26 is a memory interface (LSI) that is connected to the memory 21. The memory 21 includes a dynamic random-access-memory (DRAM) and stores a descriptor from the MPU 22 (command to the DMA chip 10 from the MPU 22) and searches data from the host computer 40A.

The DMA chip 10 has a DMA function (DMA circuit) and an interface function of communicating with the cache memory 31A. The DMA chip 10 performs communication between the DMA chip 10 and the cache memory 31A according to instruction-information transmitted from the MPU 22. According to the first embodiment, the DMA chip 10 transfers data based on the descriptor that is transmitted from the MPU 22 to the memory 21 and stored in the memory 21.

The MPU 22, the chipset 26, the protocol chip 23, and the DMA chip 10 are connected mutually by a PCI bus and transfers data mutually. Instructions from the MPU 22 to the protocol chip 23 and the DMA chip 10 are given by the PCI bus.

When the channel adapter 20A receives search data from the host computer 40A via the fiber channel link 41A, it stores the search data received in the memory 21. The MPU 22 transmits a predetermined descriptor to the memory 21 and the memory 21 stores the descriptor from the MPU 22. The DMA chip 10 reads the descriptors in the memory 21 one by one and compares the search data stored in the memory 21 and the search data (stored in the cache memory 31A (a count unit or a key unit in a record that is described later). In other words, the DMA chip 10 reads search data from the memory 21 and the cache memory 31A respectively and compares these search data.

Figure 4:
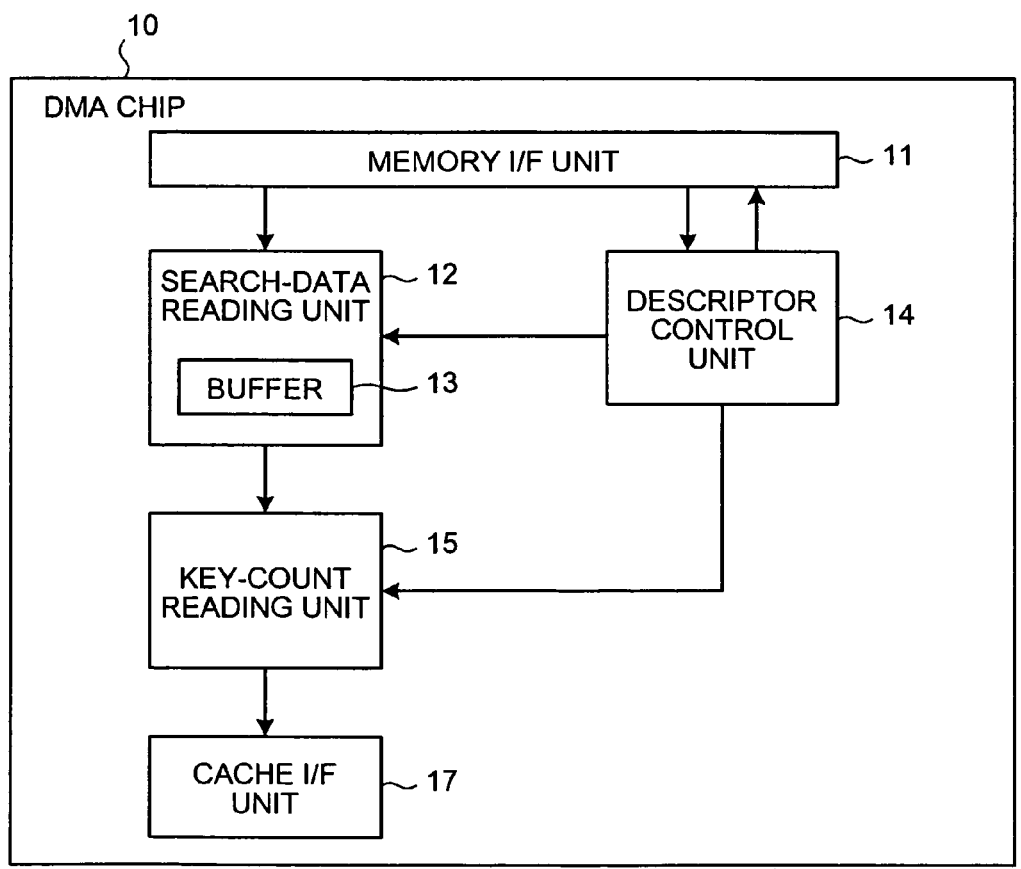
FIG. 4 is a block diagram of a DMA chip according to the first embodiment.

FIG. 4 is a block diagram of the DMA chip 10 according to the first embodiment. The DMA chip 10 includes a memory I/F unit (memory I/F block) 11, a search-data reading unit (search-data reading block) 12, a key-count reading unit (key-count reading block) 15, a descriptor control unit (descriptor block) 14, and a cache I/F unit (cache I/F block) 17.

The memory I/F unit 11 has a communication interface that connects to the memory 21, and performs a protocol control of this communication interface. The memory I/F unit 11 receives predetermined data from the memory 21 by controlling the communication interface (outputting a request for the communication interface).

The cache I/F unit 57 includes a communication interface that connects to the cache memory 31A and performs the protocol control of this communication interface. The cache I/F unit 57 receives predetermined data from the cache memory 31A by controlling the communication interface.

According to the first embodiment, the communication interface of the memory I/F unit 11, and the cache I/F unit 57 is a PCI bus and each PCI bus includes respective PCI bus protocol control circuit.

The descriptor control unit (information extracting function) 14 receives instructions (instruction information) from the MPU 22 and reads one by one the descriptors stored in the memory 21. The descriptor control unit 14 extracts predetermined information (address, data length, and mode) (comparison-data reading information and stored-data reading information) from the descriptor that is read from the memory 21 and transmits it to the search-data reading unit 12 and the key-count reading unit 15. The address includes a cache address (comparison-data address) of the cache memory 31A and a memory address (cache-memory address) of the memory 21.

The search-data reading unit (comparison-data reading function) 12 reads search data of comparison-data length from the memory 21 based on the memory address that is designated to the descriptor. The search-data reading unit 12 has a buffer 13 and the buffer 13 holds (stores) the search data that is read from the memory 21. The data stored by the buffer 13 is read by the key-count reading unit 15.

The key-count reading unit (stored-data reading function, stored-data searching function) 15 reads data of the count unit or the key unit of the comparison-data length from the cache memory as search data, based on the cache address that is designated to the descriptor. When the key-count reading unit 15 receives data (search data) from the cache memory 31A via the cache I/F unit 57, it reads the search data from the buffer 13 of the search-data reading unit 12. The key-count reading unit 15 compares the search data from the cache memory 31A and the search data from the search-data reading unit 12. The key-count reading unit 15 makes a judgment of whether a result of comparison of the search data satisfies (Hit) the comparison condition or not (Miss) and notifies the judgment to the descriptor control unit 14.

Each of the descriptor control unit 14, the search-data reading unit 12, and the key-count reading unit 15 is provided with a control function (control block). Each control block has a state machine, and controls operation of the DMA chip 10 while communicating mutually.

Figure 5:
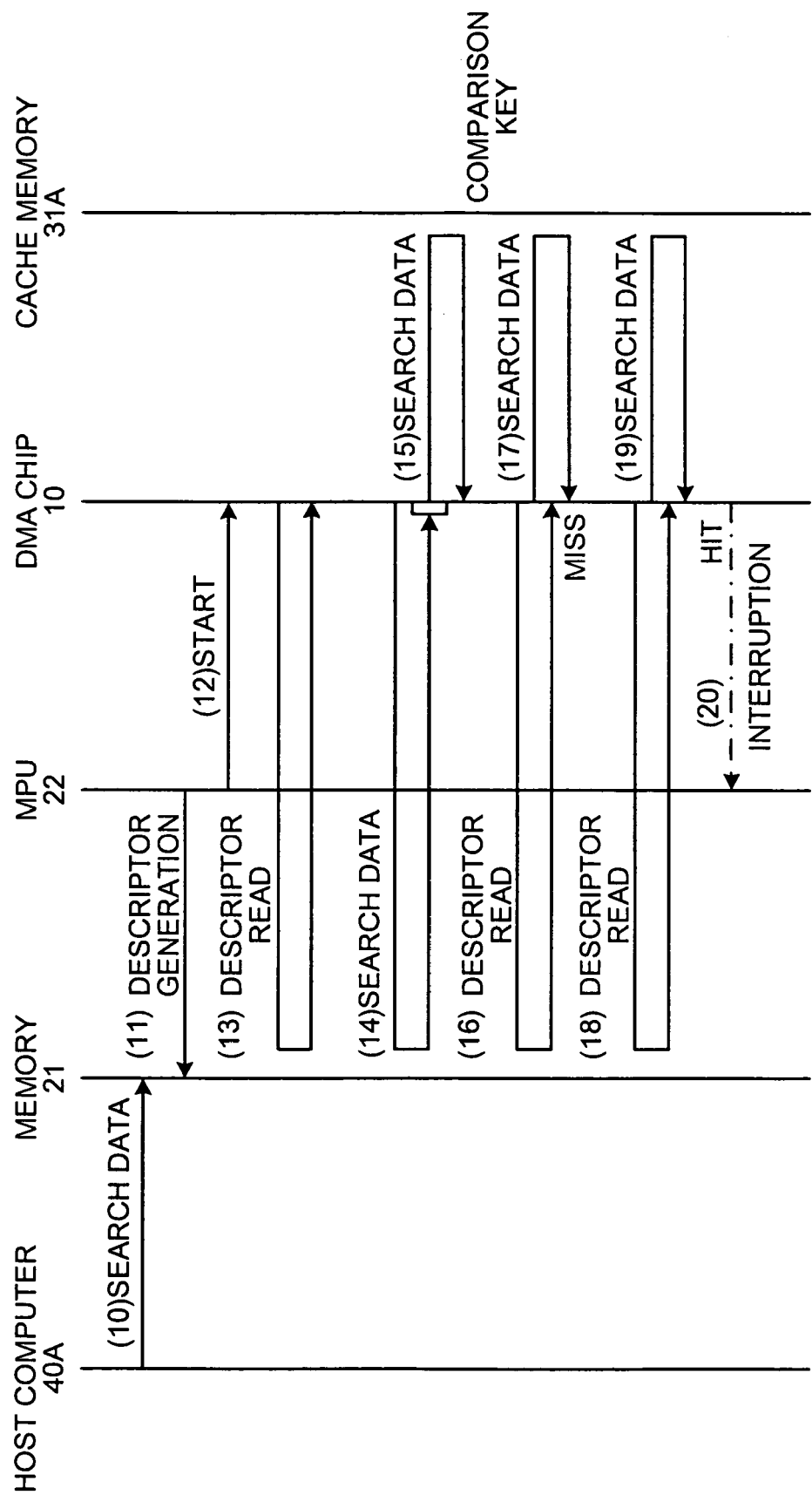
FIG. 5 is a sequence diagram of a processing procedure for a data search process of the channel adapter according to the first embodiment.

FIG. 5 is a sequence diagram of a processing procedure for a data search process of the channel adapter according to the first embodiment. The search data for searching the data that is transmitted from the host computer 40A is stored in the memory 21 in the channel adapter 20A (10). When the search data from the host computer 40A is stored in the memory 21, the MPU 22 generates (stores) a descriptor in the memory 21 (11) and activates the DMA chip 10 (12).

Figure 6:
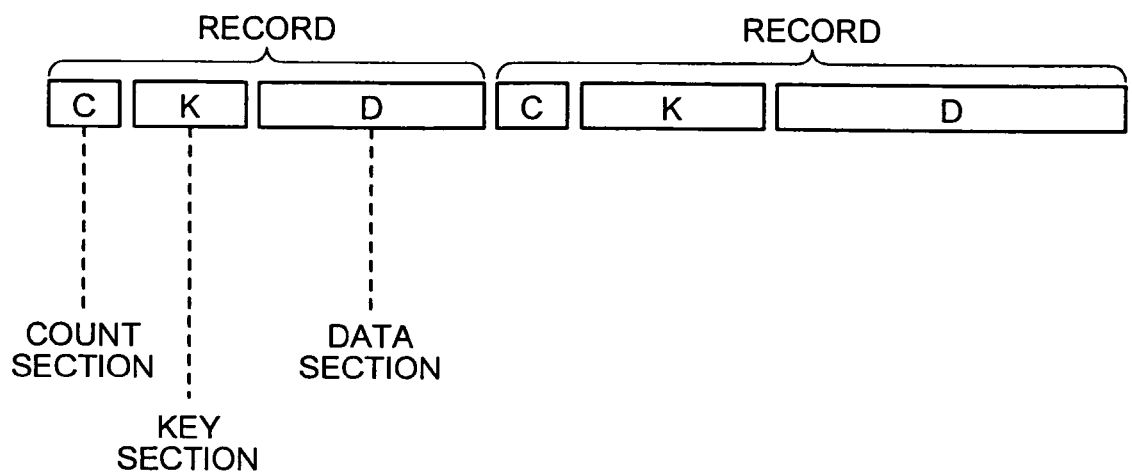
FIG. 6 is a schematic for illustrating a configuration of a CKD (Count, Key, Data) format.

A data format such as a CKD format is used in the disc array unit 30. FIG. 6 is a schematic for illustrating a configuration of the CKD format. The data in the disc array unit 30 is written in the discs 35A and 35B, and the cache memories 31A and 31B in units of records according to the CKD format (variable-length data format). Each record includes a count unit (C), a key unit (K), and a data unit (D) among which the count unit has a fixed length and the key unit and the data unit have variable length.

The count unit includes information about an address and a data length of record that is recorded. The key unit is information (such as index) that an OS (Operating System) uses for identifying the record. The data unit is information that indicates area in which user data is stored.

Figure 7:
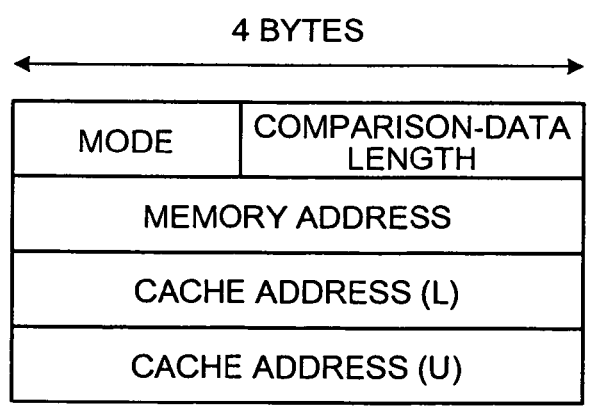
FIG. 7 is a schematic for illustrating an example of a configuration of a descriptor.

FIG. 7 is a schematic for illustrating an example of a configuration of the descriptor. A plurality of descriptors are generated in the memory 21 by the MPU 22 and each descriptor includes fields viz. "mode", "comparison-data length", "memory address", and "cache address". The "mode" is a field for controlling an operation of the DMA chip 10 and includes the following contents (information).

(1) Information of whether or not the MPU 22 performs interruption when the comparison result of the search data satisfies the conditions for comparison. When this field is "0", no interruption is performed and when this field is "1" interruption is performed. According to the first embodiment, the mode is set to "1" for example.

(2) Comparison mode (information of as to when the comparison condition is fulfilled). When this field is "00", if the search data and the key unit (or count unit) are equivalent, the comparison condition is judged to be fulfilled. When this field is "01", if the key unit is greater than or equivalent to the search data, the comparison condition is judged to be fulfilled. When this field is "1X", if the key unit is greater than the search data, the comparison condition is judged to be fulfilled.

(3) Information of whether new search data is read from the memory and used or not. When this field is "0", search data that is used in the immediately preceding descriptor is used as it is and when this field is "1", new search data is read from the memory 21 and used. This bit may be set to "1" for a first descriptor and to "0" for remaining descriptors.

The "comparison-data length" denotes byte length of the search data and the key unit or the count unit (data block for comparison). In the CKD format, since the count unit is always 8 bytes (fixed) and the key unit has a variable length from 1 byte to 255 bytes, the "comparison-data length" is a field of 8 bits so that the byte length of 1 byte to 255 bytes can be designated.

The "memory address" is an address on the memory 21 of the search data that is prepared by the MPU 22 for the DMA chip 10, and is designated by a field of 32 bits. The "cache address" is an address of the key unit or the count unit in the record on the cache memory 31A, and is designated by a field of 64 bits. The "cache address" is designated by a cache address such as a "cache address (U)" for designating upper 4 bytes on the cache memory 31A and a "cache address (L)" for designating lower 4 bytes on the cache memory 31A.

The DMA chip 10 reads a descriptor that is generated in the memory 21 (13). The DMA chip 10 reads search data from the memory 21 based on the "memory address" designated by the descriptor (14). The DMA chip 10 reads search data from the cache memory 31A of the disc array unit 30 based on the "cache address" designated by the descriptor (15).

The descriptor control unit 14 of the DMA chip 10 receives instructions from the MPU 22 and reads the descriptor stored in the memory 21. The descriptor control unit 14 extracts predetermined information (address, data-length, and mode) from the descriptor that is read and transmits it to the search-data reading unit 12 and the key-count reading unit 15.

The search-data reading unit 12 reads search data of the comparison-data length from the memory 21 based on the memory address designated by the descriptor and stores the search data that is read, in the buffer 13.

The key-count reading unit 15 reads data (search data) of the key unit or the count unit of the comparison-data length from the cache memory 31A based on the cache address designated by the descriptor. When the key-count reading unit 15 receives the data (search data) from the cache memory 31A via the cache I/F unit 57, it reads the search data from the buffer 13 of the search-data reading unit 12. The key-count reading unit 15 compares the search data from the cache memory 31A and the search data (key unit or count unit) from the search-data reading unit 12 by comparison logic. The key-count reading unit 15 makes a judgment of whether a result of the comparison satisfies (Hit) the comparison condition or not (Miss), and notifies the judgment to the descriptor control unit 14.

If the result of comparison of the search data by the DMA chip 10 is "Miss", the DMA chip 10 reads a next new descriptor from the memory 21 (16). Then, the DMA chip 10 reads new search data from the cache memory 31A based on a "cache address" that is designated by the new descriptor (17).

The DMA chip 10 compares the search data from the memory 21 and the new search data from the cache memory 31A by comparison logic, and repeats steps similar to (16) and (17) till a result of the comparison is "Hit" ((18), (19)). In other words, the DMA chip 10 performs comparison of the search data from the memory 21 with a count unit or a key unit of each record on the cache memory 31A till the comparison condition is satisfied.

The DMA chip 10 compares according to the descriptor of the memory 21 the search data and the count unit or the key unit one by one for a plurality of records till a predetermined search condition is satisfied. At this time, since the DMA chip 10 (the channel adapter 20A) cannot make a direct access to the disc 35A, an operation of searching a record on the disc 35A is replaced with a search operation of a record that is staged in the cache memory 31A.

When a value of the search data of the buffer is equivalent to a value of the data (key unit) from the cache memory 31A, if the value of the key data is greater than the value of the search data, the comparison of the search data by the DMA chip 10 (the key-count reading unit 15) is judged to satisfy (Hit) the comparison condition. When the DMA chip 10 (the descriptor control unit 14) makes a judgment of the result of comparison of the search data to be "Hit" (data corresponding to search data from the descriptor and the host computer 40A), an interruption to the MPU 22 is performed (20).

Figure 8:
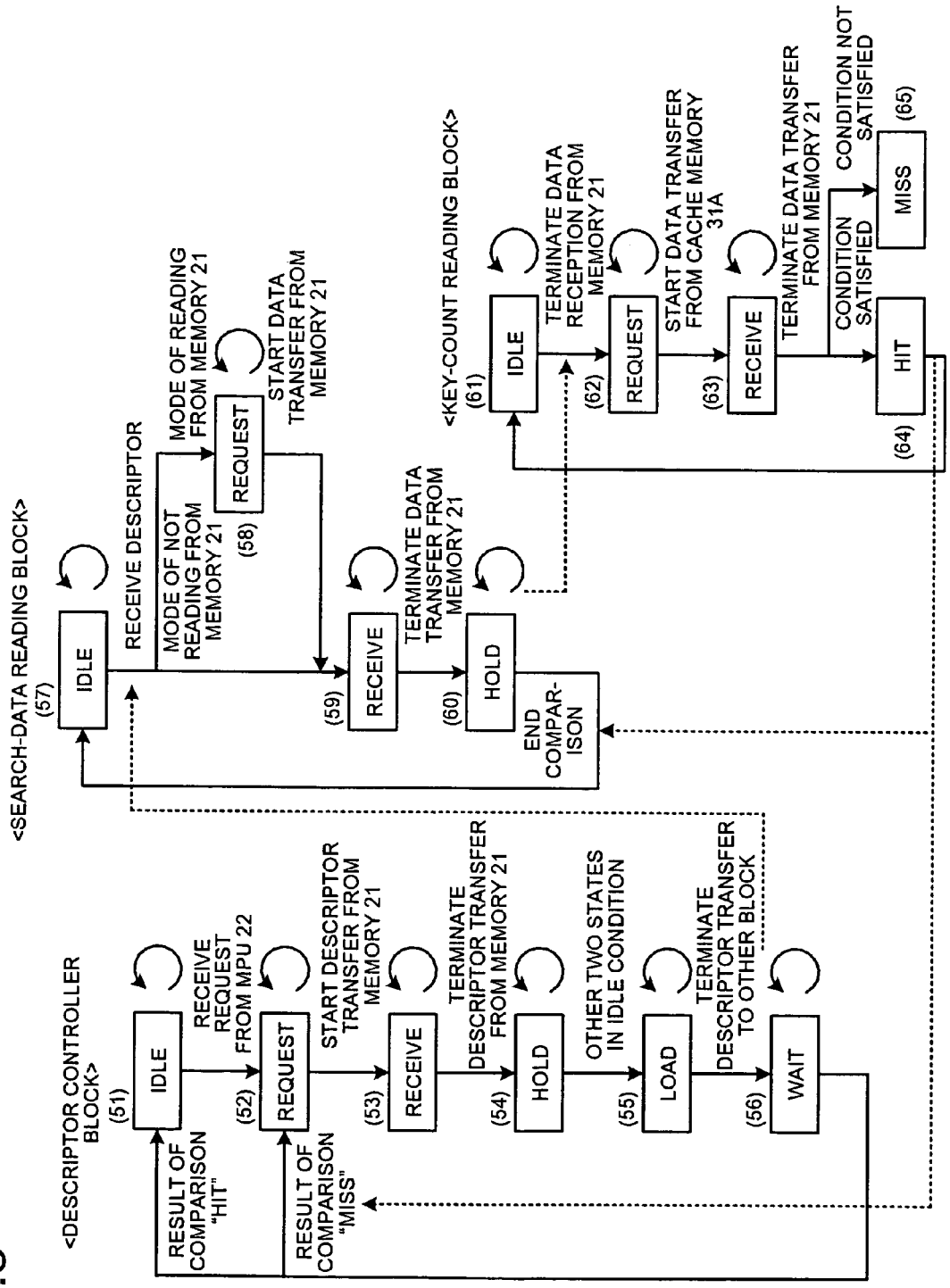
FIG. 8 is a schematic for illustrating a state transition of a state machine of the DMA chip.

FIG. 8 is a schematic for illustrating a state transition of a state machine of the DMA chip 10. In the DMA chip 10, an operation of the DMA chip 10 is controlled while there is a mutual communication among each control block of the descriptor control unit 14, the search-data reading unit 12, and the key-count reading unit 15.

If the descriptor control unit 14 receives a request for data check from the MPU 22 while in an "Idle" state (51), the state changes to a "Request" state (52) (undergoes transition). In the "Request" state (52), when a transfer of a descriptor from the memory 21 to the descriptor control unit 14 starts, the descriptor control unit 14 goes in a "Receive" state (53).

When the transfer of the descriptor in the "Receive" state is terminated, the descriptor control unit 14 goes in a "Hold" state (54).

When the descriptor control unit 14 is in the "Hold" state, if a state of the search-data reading unit 12 and of the key-count reading unit 15 is the "Idle" state, the descriptor control unit 14 goes in a "Load" step (55).

The descriptor control unit 14 transfers the descriptor to the search-data reading unit 12 and the key-count reading unit 15 in the "Load" state and when the transfer is terminated, the descriptor control unit 14 goes in a "Wait" state.

A state-transition from the "Wait" state (56) depends on states (states (64), (65) described later) of the key-count reading unit 15 of the descriptor control unit 14. In other words, when the descriptor control unit 14 is in the "Wait" state (56), if a state of the key-count reading unit is that when it is judged to be "Hit", the descriptor control unit 14 goes in "Idle" state (51). After this, the descriptor control unit 14 receives a new request from the MPU 22. Whereas, when the descriptor control unit 14 is in the "Wait" state (56), if the state of the key-count reading unit is that when it is judged to be "Miss", the descriptor control unit 14 goes in the "Request" state (52). After this, the descriptor control unit 14 receives a next new descriptor from the memory 21 and once again starts the state-transition.

The search-data reading unit 12 undergoes a state-transition from an "Idle" state (57) to a next state with a condition of the "mode" of a descriptor received from the descriptor control unit 14. In other words, the search-data reading unit 12 while in the "Idle" state (57), receives the descriptor from the descriptor control unit 14 and if a setting of whether new search data is to be read from the memory 21 in the "mode" of the descriptor or not, is "1" (setting for reading), the search-data reading unit 12 goes to a "Request" state (58).

On the other hand, the search-data reading unit 12 while in the "Idle" state (57), receives the descriptor from the descriptor control unit 14, and if the setting of whether the new search data is to be read from the memory 21 in the "mode" of the descriptor or not, is "0" (setting for not reading), the search-data reading unit 12 goes in a "Receive" state (59).

When a data transfer from the memory 21 starts while the search-data reading unit 12 is in the "Request" state (58), the search-data reading unit 12 goes in the "Receive" state (59). The data transfer from the memory 21 ends when the search-data reading unit 12 is in the "Receive" state, or when the setting is for not reading the new search data from the memory in the "mode" of the descriptor, the search-data reading unit goes in a "Hold" state (60).

The "Hold" state of the search-data reading unit 12 undergoes transition to the "Idle" state (57) when the judgment of whether "Hit" (64) or "Miss" (65) is made in the key-count reading unit 15.

When the key-count reading unit 15 terminates receiving the search data from the memory while in an "Idle" state (61), the key-count reading unit 15 goes in a "Request" state (62).

If a data transfer from the cache memory 31 starts while the key-count reading unit 15 is in the "Request" state, the key-count reading unit 15 goes in a "Receive" state (63). If the data transfer from the cache memory 31A ends while the key-count reading unit 15 is in the "Receive" state (63), the data is compared (comparison of data by comparison logic). Further, in the key-count reading unit 15, when a judgment of whether a result of the comparison satisfies the comparison condition, is made, the key-count reading unit 15 goes in a state such that the judgment is "Hit" (64). On the other hand, in the key-count reading unit 15, if the result of comparison is judged not to have satisfied the comparison condition, the key-count reading unit 15 goes in a state such that the judgment is "Miss" (65). After an end of comparison of the data by the key-count reading unit 15, the search-data reading unit 12 and the descriptor control unit 14 undergo transition to the next state.

According to the first embodiment, in a case of the "Hit" during the comparison of the search-data by the key-count reading unit 15, data check is let to be completed and the interruption to the MPU 22 from the DMA chip 10 is performed. However, an arrangement may be made such that in a case of "Miss" during the comparison of the search data by the key-count reading unit 15, the data check is let to be completed and the interruption to the MPU 22 from the DMA chip 10 is performed.

Moreover, a descriptor is generated in the memory of the channel adapter. However, an arrangement may be made such that the descriptor is generated in a predetermined storing unit in the DMA chip 10.

Furthermore, since the memory 21 of the channel adapter is let to store the search data from the descriptor and the host computer 40A, a configuration may be allowed to be such that the search data from the descriptor and the host computer 40A is stored by a different storing unit.

Thus, since the DMA chip 10 includes the descriptor control unit 14, and the MPU 22 generates a descriptor in the memory 21, while comparing a set of search data, every time it is not necessary for the MPU 22 to generate and transmit information for comparing the key unit or the count unit of each field. Therefore, once the MPU 22 makes a request for data search to the DMA chip 10 chip, it is possible to continue the data search based on the descriptor that is generated in the memory 21 by the DMA chip 10.

Thus, according to the first embodiment, it is possible to reduce a load on the MPU 22 during the data search and the DMA chip 10 can perform the data search while the MPU 22 performs other process. This enables to speed-up the data search and to improve an efficiency of the data transfer.

According to a second embodiment of the present invention, reading the search data from the host computer 40A and reading the key unit or the count unit from the cache memory 31A are started simultaneously, and when the search data stored in the buffer is caused to be read by a comparing unit 54, the key-count reading unit reads a next search data.

Figure 9:
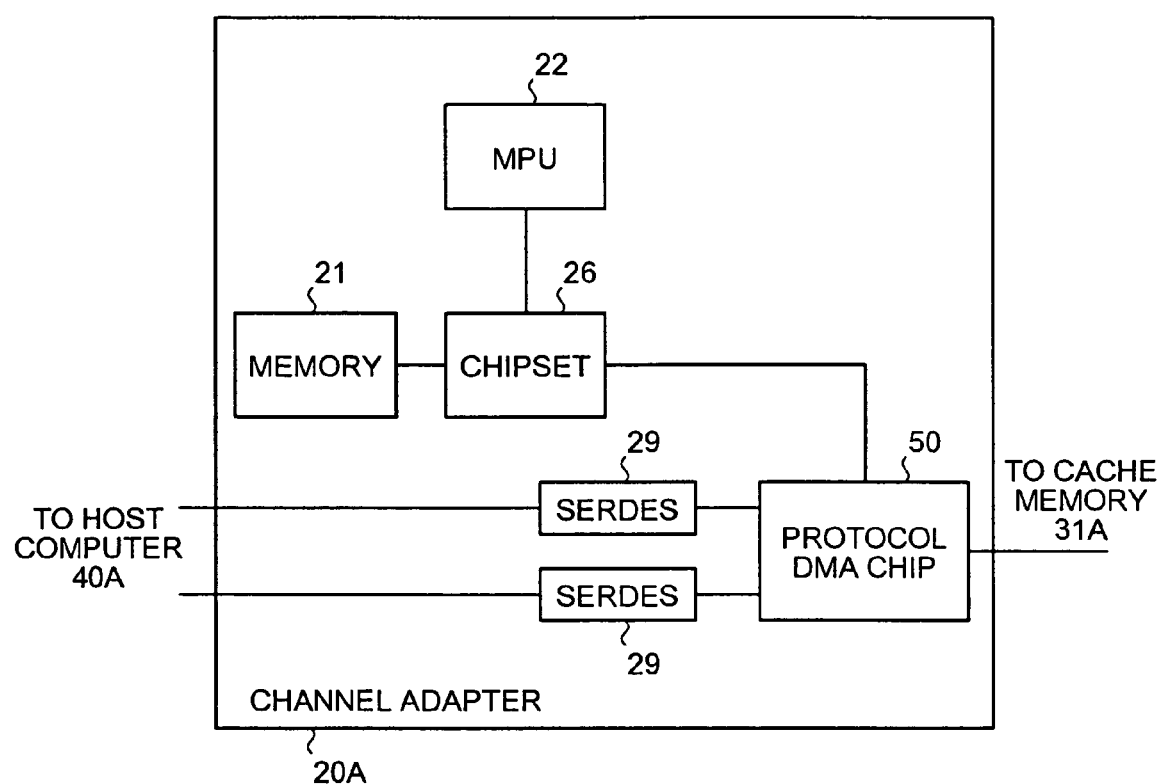
FIG. 9 is a block diagram of an example of a channel adapter according to a second embodiment of the present invention.

FIG. 9 is a block diagram of an example of a channel adapter 20A according to according to the second embodiment. The same reference numerals are used for components in FIG. 9 that have the same function as the components in the channel adapter 20A in the first embodiment shown in FIG. 3 and repeated description is avoided by omitting that description. In this case, the memory 21 is a comparison-data storing unit.

The channel adapter 20A according to the second embodiment includes the memory 21, the MPU 22, the chipset 26, a serdes (serializer/deserializer) 29, and a protocol DMA chip 50. The serdes 29 is a device that converts parallel data to serial data and vice versa.

The protocol DMA chip (transferring unit) 50 has a function of the protocol chip 23 and the DMA chip 10. The protocol DMA chip 50 is connected to the cache memory 31A by a bus such as the PCI bus and a PCI-X bus, as well as is connected to the host computer 40A via the serdes 29.

Figure 10:
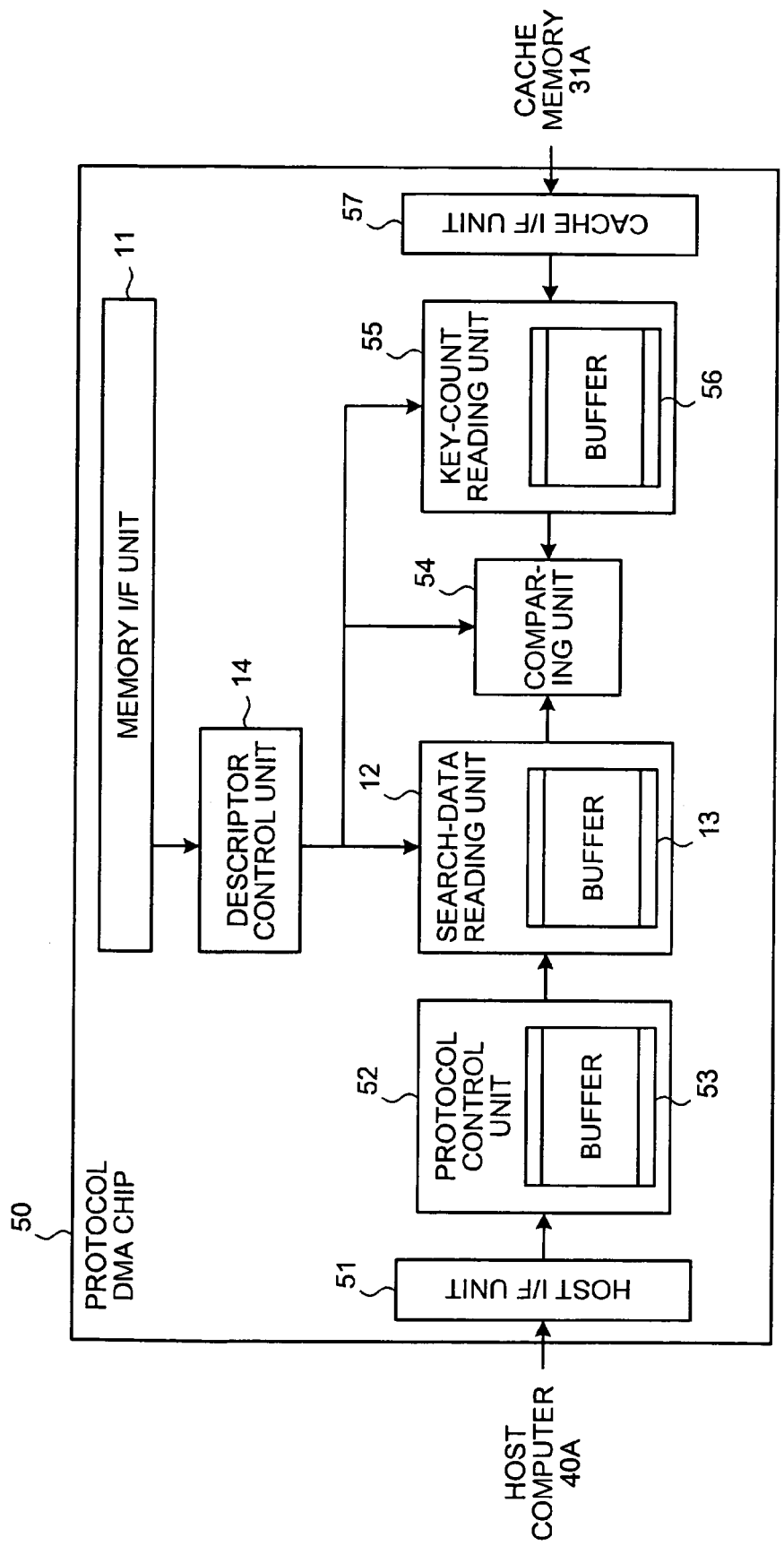
FIG. 10 is a block diagram of an example of a protocol DMA chip according to the second embodiment.

FIG. 10 is a block diagram of an example of the protocol DMA chip 50 according to the second embodiment. The same reference numerals are used for components in FIG. 10 that have the same function as the components of the DMA chip 10 according to the first embodiment shown in FIG. 4 and the corresponding descriptions are omitted.

The protocol DMA chip 50 includes the memory I/F unit 11, the descriptor control unit 14, the search-data reading unit 12, the cache I/F unit 57, a host I/F unit 51, a protocol control unit 52, the comparing unit 54, and a key-count reading unit 55.

The memory I/F unit 11 is connected to the descriptor control unit 14. The descriptor control unit 14 is connected to the search-data reading unit 12, the comparing unit 54, and the key-count reading unit 55. The descriptor control unit 14 receives instructions from the MPU 22, reads the descriptor stored in the memory 21, and transmits information in the descriptor to the search-data reading unit 12, the comparing unit 54, and the key-count reading unit 55. The host I/F unit 51 has a function of a communication I/F of transmitting and receiving data to and from the host computer 40A.

The protocol control unit 52 controls a protocol that is for communication with the host computer 40A. The protocol control unit 52 includes a buffer 53 that includes a static RAM (SRAM) and the like. The protocol control unit 52 is connected to the search-data reading unit 12 and the host I/F unit 51, and transmits the search data to the search-data reading unit 12 after storing the search data from the host I/F unit 51 in the buffer 53.

The search-data reading unit 12 is connected to the protocol control unit 52 by a predetermined bus (such as fiber bus). The search-data reading unit 12 includes the buffer (first buffer) 13, and transmits the search data to the comparing unit 54 after storing the search data in the buffer 13. In other words, the buffer 13 reads and stores temporarily the search data in the buffer 53, and when the search data stored temporarily is read by the comparing unit 54, reads the next search data from the buffer 53 and stores it temporarily.

The key-count reading unit 55 is connected to the cache I/F unit 57 by a predetermined bus (such as PCI bus). The key-count reading unit 55 includes a buffer (second buffer) 56. The key-count reading unit 55 receives search data (key unit or count unit) from the cache memory 31A via the cache I/F unit 57, stores the search data in a buffer 56, and then transmits the search data to the comparing unit 54. When the data stored in the buffer 56 is read by the comparing unit 54, the key-count reading unit 55 reads the next search data from the cache memory 31A and stores it in the buffer 56. In other words, the buffer 56 reads and stores temporarily the search data in the cache memory 31A, and when the search data stored temporarily is read by the comparing unit 54, reads the next search data from the cache memory and stores it temporarily.

The comparing unit 54 reads the search data stored by the buffer 13 of the search-data reading unit 12 and the search data stored by the buffer 56 of the key-count reading unit 55 and compares these search data.

According to the second embodiment, a transmission-speed of the bus that connects the search-data reading unit 12 and the protocol control unit 52 differs from a transmission speed of the bus that connects the key-count reading unit 55 and the cache I/F unit 57. The transmission-speed of the bus that connects the key-count reading unit 55 and the cache I/F unit 57 is faster than the transmission speed of the bus that connects the search-data reading unit 12 and the protocol control unit 52.

While performing the data search by instructions from the host computer 40A, reading the search data by the search-data reading unit 12 and reading the search data by the key-count reading unit 55 are started simultaneously. When the search data stored in the buffer 13 is read by the comparing unit 54, the search-data reading unit 12 reads the next search data and when the search data stored in the buffer 56 is read by the comparing unit 54, the key-count reading unit 55 reads the next search data. The comparing unit 54 reads the search data from the search-data reading unit 12 and the key-count reading unit 55, and compares these search data repeatedly.

An arrangement may be made such that the transmission-speed of the bus that connects the search-data reading unit 12 and the protocol control unit 52 is faster than the transmission-speed of the bus that connects the key-count reading unit 55 and the cache I/F unit 57.

According to the second embodiment, the configuration is made such that the protocol DMA chip 50 is provided with the descriptor control unit 14. However, the configuration may be made such that the protocol DMA chip 50 is provided with a registering unit (register block) instead of the descriptor control unit 14. In this case, every time the registering unit compares a set of the search data, the MPU 22 interrupts and information such as the memory address, the cache address, and the mode is transmitted from the MPU 22 to the DMA chip 10.

Thus, according to the second embodiment, since the key-count reading unit 55 includes the buffer 56, after the reading of the search data by the comparing unit 54 ends, even if the reading of the search data from the protocol control unit 52 to the search-data reading unit 12 is not completed, the key-count reading unit 55 can read the next search data from the cache memory 31A. In other words, the key-count reading unit 55 can read new search data before the search-data reading unit 12 reads the entire search data stored in the buffer 53 of the protocol control unit 52. This enables to read and transfer without reading and transferring of the bus with a high transmission-speed waiting for reading and transferring of the bus with a low transmission-speed, thereby enabling to transfer the data efficiently.

A third embodiment of the present invention explains a case of achieving a high-speed data search and improving an efficiency of data transfer by the DMA chip performing the data search without halt while the MPU22 performs the data processing.

Figure 11:
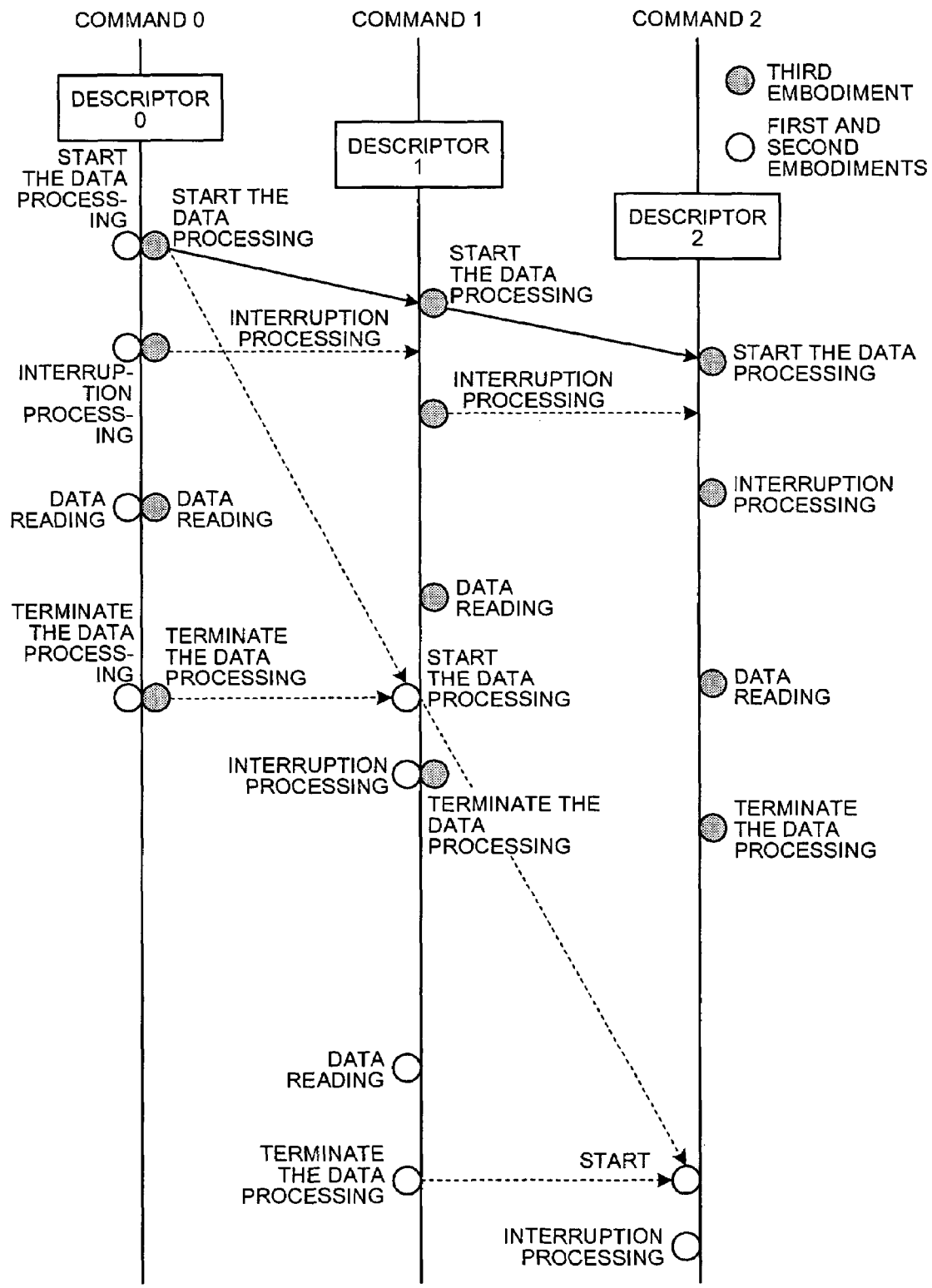
FIG. 11 is a schematic for illustrating a concept of a DMA control according to a third embodiment of the present invention.

FIG. 11 is a schematic for illustrating a concept of a DMA control according to the third embodiment. FIG. 11 contrasts the processing of the DMA control (black circle) according to the third embodiment with the processing of the DMA control (white circle) according to the first and second embodiments.

Based on the processing of the DMA control according to the first and second embodiments, when the host computer 40A serially issues execution commands (command 0, command 1, command 2) for data searching, the MPU22 generates descriptors (descriptor 0, descriptor 1, descriptor 2) corresponding to each command.

The DMA chip 10 starts a data processing of searching a data requested by the host computer 40A from the cache memory 31A using one of the generated descriptors (herein, the descriptor 0).

When the data requested by the host computer 40A is not stored in the cache memory 31A but the data is read from the disc 35, the cache memory 31A stores the data in it.

As a result of the data search, when data requested by the host computer 40A is found in the cache memory 31A, the DMA chip 10 performs an interruption to the MPU 22. The MPU 22 then performs a data read of reading the data from the cache memory 31A to terminate the data processing corresponding to command 0.

The DMA chip 10 then performs the similar process to the data processing described above using another descriptor (herein, descriptor 1). The data processing for each of command 0, command 1, and command 2, is performed in sequence in the same manner.

On the other hand, based on the processing of the DMA control according to the third embodiment, when a DMA chip 200 described hereinafter performs the interruption to the MPU 22, the DMA chip 200 starts to process the data corresponding to a next command without waiting for a completion of the data read by the MPU 22.

In this case, the descriptor generated by the MPU 22 contains identification information for uniquely identifying the search data received from the host computer 40A. When the data requested by the host computer 40A is found in the cache memory 31A, the DMA chip 200 stores the information indicating that the data is searched as associated with the identification information in the memory to start another data processing for the next command.

On the other hand, after being interrupted by the DMA chip 200, the MPU 22 performs the data read of reading the search data from the cache memory 31A based on the information of the result of the search for the data stored in the memory.

Based on the processing of the DMA control according to the third embodiment, since the DMA chip 200 performs the next data search without waiting for the completion of the data read by the MPU 22, the data processing can be performed at a high speed in a parallel manner.

While the data search performed by the DMA chip 200 normally takes tens to hundreds of nanoseconds, the data processing performed by the MPU 22 takes as long as tens of milliseconds, and therefore the efficiency of the processing can be greatly improved by the DMA chip 200 performing the next data search without waiting for the completion of the data processing by the MPU 22.

Since a configuration of a channel adapter having the MPU is similar to the configuration shown in FIG. 3, the function of the MPU 22 according to the third embodiment is described with reference to FIG. 3.

The MPU 22 according to the third embodiment generates a descriptor to store in the memory 21 and starts the DMA chip 200 when the search data is stored in the memory 21 from the host computer 40A. Herein, the descriptor generated by the MPU 22 contains the identification information for identifying the search data transmitted from the host computer 40A.

The MPU 22 also performs the data read of reading the data searched from the cache memory 31A based on information concerning a state of the search processing indicating whether the data corresponding to the search data transmitted from the host computer 40A is found.

Figure 12:
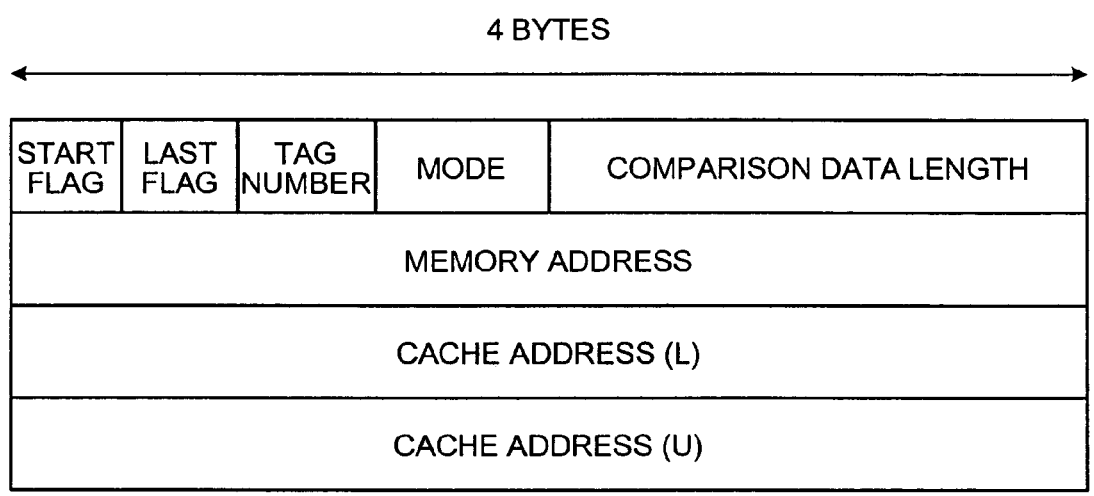
FIG. 12 is a schematic for illustrating an example of a configuration of a descriptor according to the third embodiment.

FIG. 12 is a schematic for illustrating an example of a configuration of the descriptor according to the third embodiment. A plurality of the descriptors is generated for each search data by the MPU 22, and stored in the memory 21.

A group of the descriptors generated for a certain search data is referred to as a descriptor block. It is also assumed that three descriptors herein belong to one descriptor block. The descriptor block is detailed with reference to FIG. 13.

As shown in FIG. 12, the descriptor includes fields of "start flag", "last flag", "tag number", "mode", "comparison data length", "memory address", and "cache address".

The "start flag" is a one-bit information indicating whether the descriptor is the first descriptor in which the data is searched in the descriptor block, indicating that this is the first descriptor in which the data is searched when this field shows "1" and indicating that another descriptor is the first descriptor in which the data is searched when this field shows "0".

The "last flag" is a one-bit information indicating whether the descriptor is the last descriptor in which the data is searched in the descriptor block, indicating that this is the last descriptor in which the data is searched when this field shows "1" and indicating that another descriptor is the last descriptor in which the data is searched when this field shows "0".

The "tag number" is a two-bit identification number identifying the search data transmitted by the host computer 40A, which is assigned to each descriptor block.

The descriptor block is explained below. FIG. 13 is a schematic for illustrating the descriptor block. The number of the descriptors can be any number (for instance, 2000 blocks), while FIG. 13 shows no more than four descriptor blocks (descriptor block 0, descriptor block 1, descriptor block 2, descriptor block 3).

Each descriptor block is a combination of three descriptors (descriptor 0, descriptors1 descriptor2). The descriptors belonging to the same descriptor block are assigned with a common "tag number".

The "start flag" for the descriptor 0 is set at "1" as the first descriptor in which the data is searched. The "last flag" for the descriptor 2 is set at "1" as the last descriptor in which the data is searched. The "start flag" and the "last flag" for the descriptor 1 are both set at "0" as the second descriptor in which the data is searched.

Returning to the explanation of FIG. 12, "mode", "comparison data length", "memory address", and "cache address" are same as the "mode", "comparison data length", "memory address", and "cache address" explained with reference to FIG. 7. In the third embodiment, the "mode" is set at "1".

Figures 14, 15:
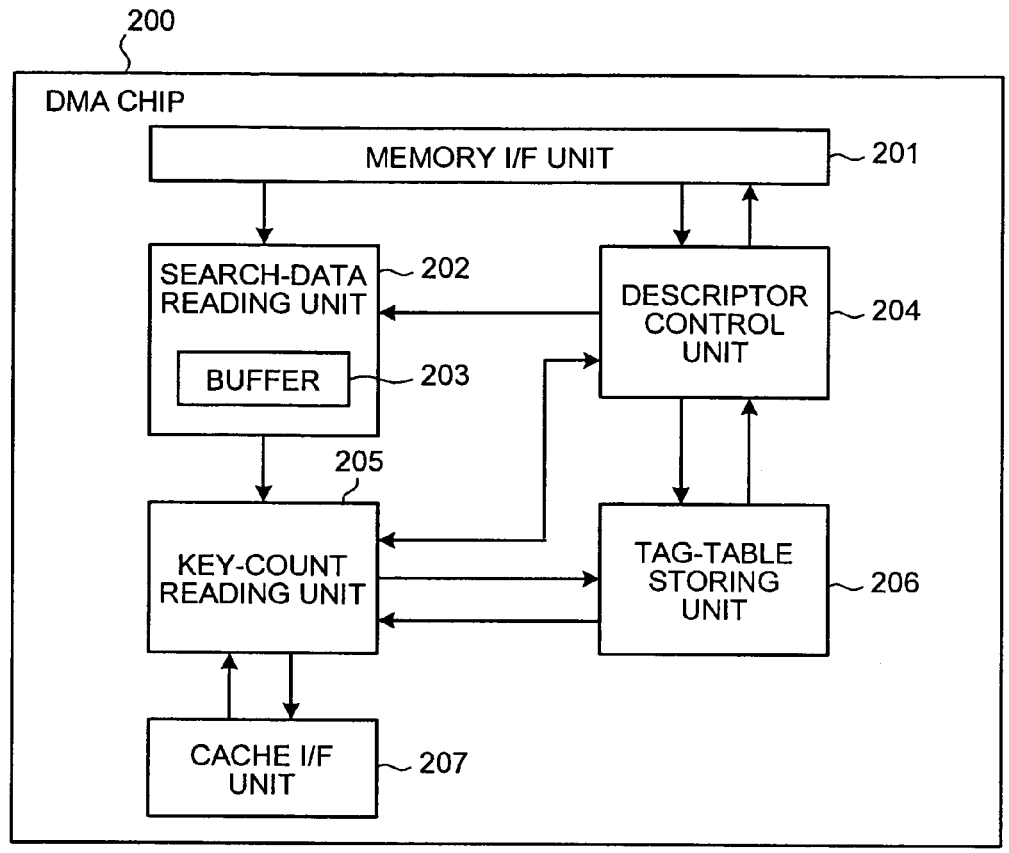
FIG. 14 is a block diagram of a DMA chip according to the third embodiment.
FIG. 15 is a schematic for illustrating a configuration of a tag table.

FIG. 14 is a block diagram of the DMA chip 200 according to the third embodiment. The DMA chip 200 includes a memory I/F unit (memory I/F block) 201, a search-data reading unit (search-data reading block) 202, a buffer 203, a descriptor control unit (descriptor block) 204, a key-count reading unit (key-count reading block) 205, a tag-table storing unit 206, and a cache I/F unit (cache I/F block) 207.

The memory I/F unit 201, the search-data reading unit 202, the buffer 203, and the cache I/F unit 207 are function units each having a same function as those of the memory I/F unit 11, the search-data reading unit 12, the buffer 13, and the cache I/F unit 57 in the DMA chip 10 indicated in FIG. 4. Each of communication interfaces in the memory I/F unit 201 and the cache I/F unit 207 is a PCI bus configured with a PCI bus protocol control circuit.

The tag-table storing unit 206 is a memory recording the tag table containing information concerning a state of the data search processing using the descriptor. FIG. 15 is a schematic for illustrating a configuration of the tag table. The tag table includes fields of "tag number", "hit flag", "error flag", "last flag", and "valid flag".

The "tag number" is equivalent to the "tag number" explained with reference to FIG. 12, which is a number for identifying the search data transmitted from the host computer 40 and assigned to each descriptor block.

The "hit flag" is information indicating that a comparison condition is satisfied when the key-count reading unit 205 described later compares the search data from the cache memory 31A and the search data from the search-data reading unit 202 and the comparison result satisfies the comparison condition. More specifically, a default of the "hit flag" is set at "0", but the value for the "hit flag" is updated to "1" when the comparison condition is satisfied.

The "error flag" is information indicating that the comparison condition is not satisfied when the key-count reading unit 205 compares the search data from the cache memory 31A and the search data from the search-data reading unit 202 and the comparison result does not satisfy the comparison condition. More specifically, a default of the "error flag" is set at "0", but the value for the "error flag" is updated to "1" when the comparison condition is not satisfied.

The "last flag" is information indicating that all the data search processings are terminated when the data search processings for the descriptors belonging to the descriptor block are terminated. More specifically, a default of the "last flag" is set at "0", but the value for the "last flag" is updated to "1" when all the data search processings are terminated.

The "valid flag" is information indicating whether a processing of the data corresponding to the "tag number" is terminated. More specifically, the "valid flag" is set at "1" either when the comparison result of the search data satisfies the comparison condition, or when the comparison result of the search data does not satisfy the comparison condition.

The MPU 22 reads the data from the cache memory 31A when the "valid flag" indicates "1". After the MPU 22 completes the reading processing of reading the data from the cache memory 31A, the value for the "valid flag" is updated to "0". When the comparison result of the search data does not satisfy the comparison condition, the value for the "valid flag" is cleared to show "0" along with other values for the "tag number", the "error flag", and the "last flag".

When there is a plurality pieces of information concerning the state where the "valid flag" indicates "1", the priority order of the information for processing is determined by the MPU 22, and therefore the DMA chip 200 does not set the priority order.

Since an example of the "tag number" indicating "0" shows the "hit flag" indicating "1", the "error flag" indicating "0", the "last flag" indicating "1", and the "valid flag" indicating "0", this example indicates that the result of comparison of the search data satisfies the comparison condition, that all the data search processings for the descriptors belonging to the descriptor block are terminated and that the MPU 22 has read the data from the cache memory 31A. In this case, the value in each field is cleared to indicate "0".

In another example of the "tag number" indicating "1", since the "hit flag" indicates "0", the "error flag" indicates "1", the "last flag" indicates "1" and the "valid flag" indicates "0", this example indicates that the comparison result of the search data does not satisfy the comparison condition, that all the data search processings for the descriptors belonging to the descriptor block are terminated, and that the comparison result of the search data did not satisfy the comparison condition. In this case, the value in each field is cleared to indicate "0".

In still another example of the "tag number" indicating "2", since the "hit flag" indicates "1", the "error flag" indicates "0", the "last flag" indicates "0", and the "valid flag" indicates "1", this example indicates that the comparison result of the search data satisfies the comparison condition and that not all the data search processings for the descriptors belonging to the descriptor block are terminated (the comparison result of the search data satisfied the comparison condition before all the descriptors were used, at which point the data search processing was terminated), waiting for the completion of the data processing by the MPU 22.

In still another example of the "tag number" indicating "3", since the "hit flag" indicates "0", the "error flag" indicates "0", the "last flag" indicates "0", and the "valid flag" indicates "0", this example indicates that the descriptor corresponding to the "tag number" "3" is not yet used for the data search processing.

Returning to the explanation of FIG. 14, the descriptor control unit (information extracting function) 204 reads the descriptors stored in the memory 21 one by one in response to a command from the MPU 22 (in response to receipt of the command information).

The descriptor control unit 204 then registers the "tag number" for the descriptor in the "tag number" field of the tag table stored in the tag-table storing unit 206, and sets the "last flag" in the tag table at "1" when the descriptor is the last descriptor in which the data search is performed in the descriptor block. The descriptor control unit 204 determines whether to move to the data search processing for the next descriptor block by referring to the information concerning the "last flag".

The descriptor control unit 204 extracts predetermined information (address, data length, mode) (comparison-data reading information, stored-data reading information) in the descriptor read from the memory 21 and transmits the information to the search data reading unit 202 and the key-count reading unit 205. The address herein contains a cache address (comparison-data address) of the cache memory 31A and a memory address (cache memory address) of the memory 21.

The descriptor control unit 204 also makes a request for interruption to the MPU 22 and transmits information on the tag table to the MPU 22 when the key-count reading unit 205 performs the comparison processing of the search data and the comparison result satisfies the comparison condition.

Further, either when the comparison result satisfies the comparison condition and the MPU 22 reads the data from the cache memory 31A or when the comparison result does not satisfy the comparison condition, the descriptor control unit 204 updates the "valid flag" in the tag table stored in the tag-table storing unit 206 from "1" to "0" and clears the "tag number", "start flag", "error flag", and "last flag" in association with the "valid flag" indicating "0" to show "0".

The key-count reading unit 205 (stored-data reading function, stored-data searching function) reads a data on the key unit or the count unit of the comparison data length as the search data from the cache memory 31A based on the cache address specified by the descriptor.

When the key-count reading unit 205 receives the data (search data) from the cache memory 31A via the cache I/F unit 57, the key-count reading unit 205 reads the search data from the buffer 203 in the search-data reading unit 202 and compares the search data from the cache memory 31A with the search data from the search-data reading unit 202 based on the comparison logic.

The key-count reading unit 205 then makes a judgment of whether the result of comparison of the search data satisfies the comparison condition or not and notifies the judgment to the descriptor control unit 204. The key-count reading unit 205 also updates the "hit flag" and the "error flag" in the tag table stored in the tag-table storing unit 206 based on the result of the judgment, and when the "hit flag" is updated to "1", the key-count reading unit 205 updates the "valid flag" to "1" to wait for the data reading processing by the MPU 22.

The descriptor control unit 204, the search-data reading unit 202, and the key-count reading unit 205 each includes a controlling function (controlling block). Each controlling block has a state machine so as to control the operation of the entire DMA chip 200 while communicating one another.

Figure 16:
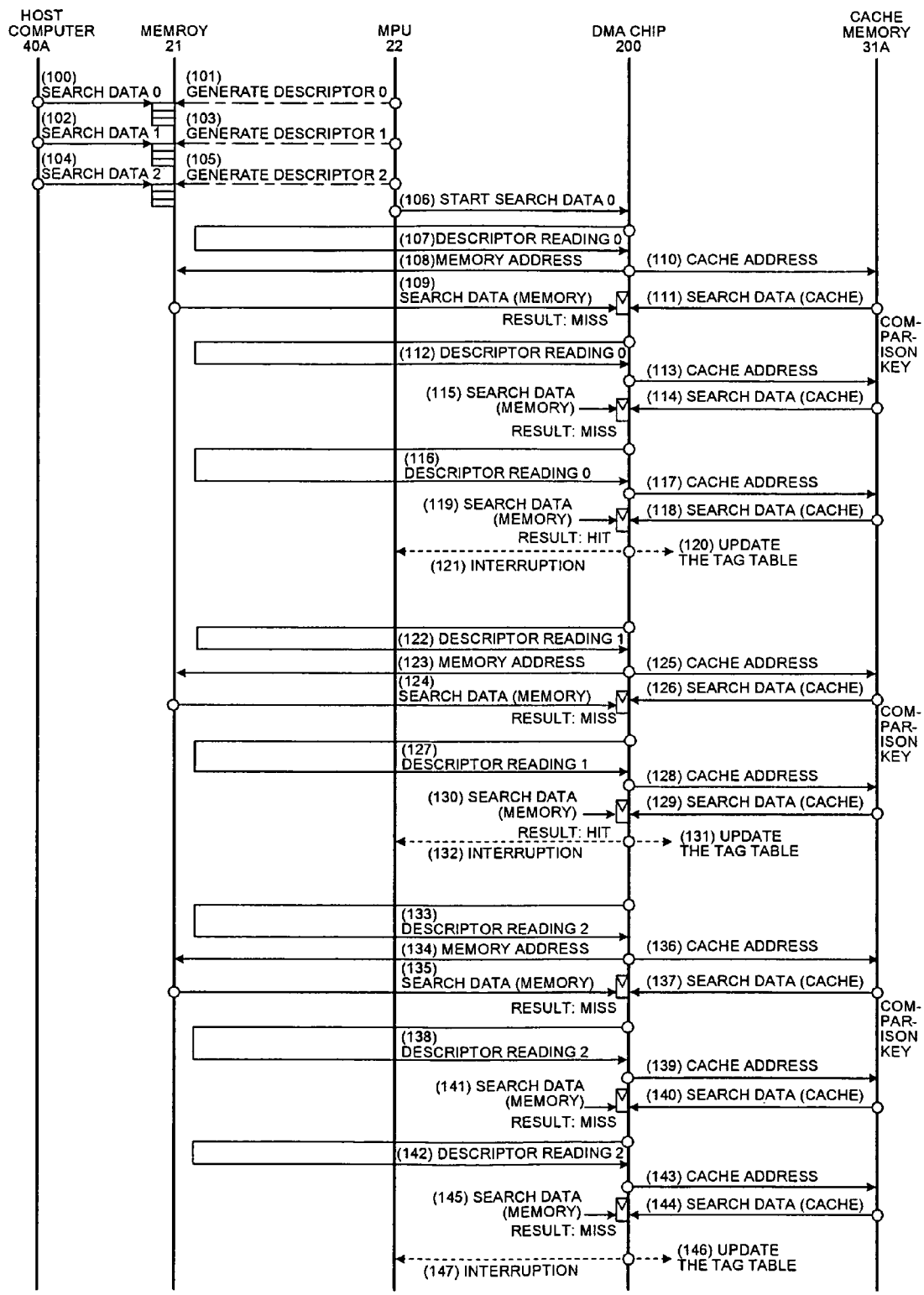
FIG. 16 is a sequence diagram of a processing procedure for a data search process of the channel adapter according to the third embodiment.
Figure 18:
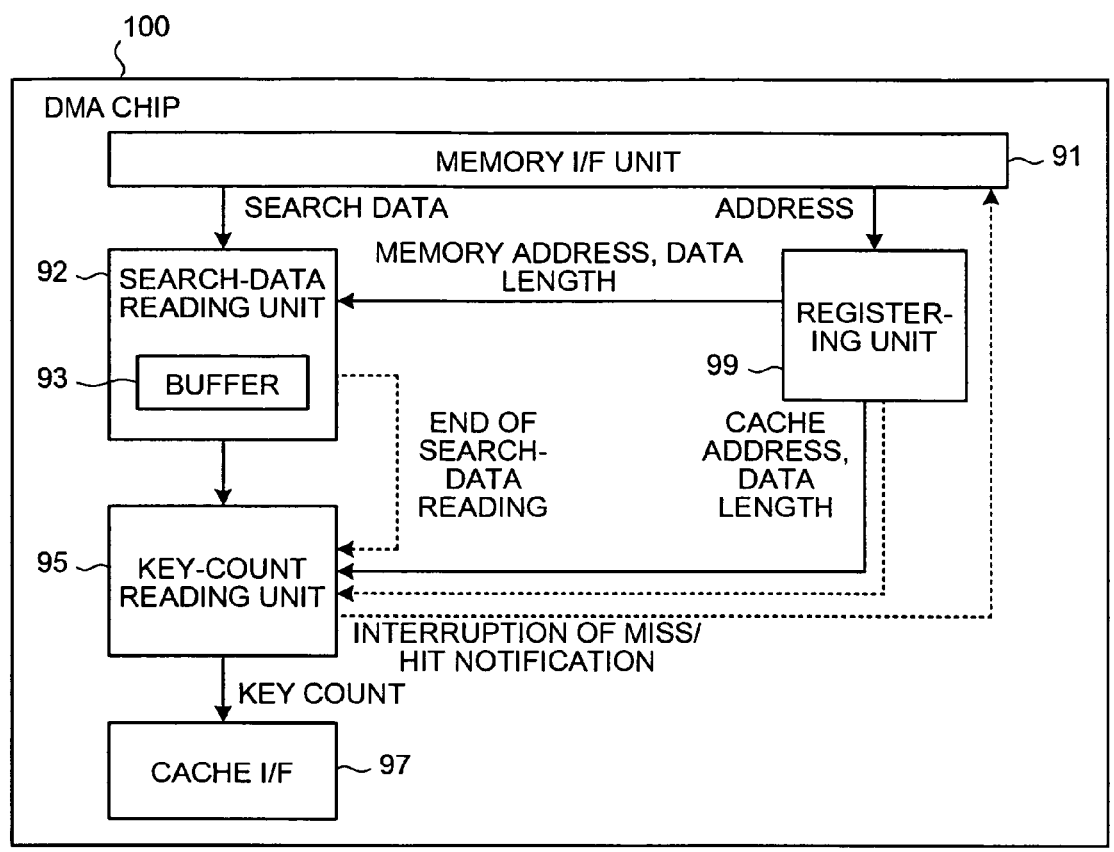
FIG. 18 is a block diagram of a DMA chip according to a conventional technology.

FIG. 16 is a sequence diagram of a processing procedure for a data search process of the channel adapter 20A according to the third embodiment. FIG. 17 is a chart explaining updates of the tag table. A case of receiving three search data for the data search from the host computer 40A in succession is explained below.

As shown in FIG. 16, when the host computer 40A transmits the search data (search data 0, search data 1, search data 2)

for data searching, the memory 21 in the channel adapter 20A stores the search data ((100), (102), (104)).

When the search data from the host computer 40A is stored in the memory 21, the MPU 22 generates the descriptors (descriptor 0, descriptor 1, descriptor 2) corresponding to each of the search data, stores the same in the memory 21 ((101), (103), (105)), and starts the DMA chip 200 to start the data search processing for the search data 0 (106).

The DMA chip 200 reads the descriptor 0 generated by the memory 21 (107). The DMA chip 200 then reads the search data from the memory 21 based on the "memory address" specified by the descriptor ((108), (109)) and reads the search data from the cache memory 31A in the disc array unit 30 based on the "cache address" specified by the descriptor ((110), (111)).

The descriptor control unit 204 in the DMA chip 200 reads the descriptor stored by the memory 21 under the at the instruction of the MPU 22, extracts predetermined information (address, data length, mode) from the read descriptor, and transmits the same to the search-data reading unit 202 and the key-count reading unit 205.

The search-data reading unit 202 reads the search data of the comparison data length from the memory 21 based on the memory address specified by the descriptor, and stores the read searched data in the buffer 203.

The key-count reading unit 205 reads the data (search data) on the key unit or the count unit of the comparison data length from the cache memory 31A based on the cache address specified by the descriptor.

Also, when the key-count reading unit 205 receives the data (search data) from the cache memory 31A via the cache I/F unit 207, the key-count reading unit 205 reads the searched data from the buffer 203 in the search-data reading unit 202.

The key-count reading unit 205 compares the search data from the cache memory 31A with the search data from the search-data reading unit 202 (the key unit or the count unit) based on the comparison logic.

The key-count reading unit 205 then makes a judgment of whether the result of comparison of the search data satisfies (Hit) the comparison condition or not (Miss) and notifies the judgment to the descriptor control unit 204.

The comparison processing of the searched data by the key-count reading unit 205 determines that the comparison condition is satisfied (Hit), for instance, when the value of the search data from the buffer 203 is equal to the value of the data from the cache memory 31A (the key unit), when the value of the key unit is equal to or larger than the value of the search data, or when the value of the key unit is larger than the value of the search data.

When the result of the comparison of the search data by the DMA chip 200 is "Miss", the DMA chip 200 reads a new descriptor belonging to the descriptor block corresponding to the search data 0 from the memory 21 (112).

The DMA chip 200 then reads a new search data from the cache memory 31A based on a "cache address" specified by a new descriptor ((113), (114)).

The DMA chip 200 compares the search data (115) from the memory 21 with the new search data from the cache memory 31A based on the comparison logic and repeats the similar processings to (112), (113), (114), (115) until the result of comparison "Hits" or all the results of comparison of the searched data using each descriptor belonging to the descriptor "Misses" ((116), (117), (118), 119)).

Namely, the DMA chip 200 continues the comparison of the search data from the memory 21 with the count unit or the key unit of each record on the cache memory 31A until the comparison condition is satisfied.

The DMA chip 200 performs the comparison of the search data with the count unit or the key unit with respect to a plurality of records in turn according to the descriptor in the memory 21 until a predetermined searching condition is satisfied. At this time, since the DMA chip 200 (the channel adapter 20A) cannot directly access the disc 35A, an action of searching for a record on the disc 35A is replaced by an action of searching for a record staged in the cache memory 31A.

When it is judged that the result of comparison of the search data "Hit" (fall into a data corresponding to the search data from the descriptor and the host computer 40A), the DMA chip 200 (the descriptor control unit 204) updates the tag table stored in the tag-table storing unit 206 (120) and performs an interruption processing to the MPU 22 (121).

An updated tag table is shown at the top of FIG. 17. While this tag table sets three "tag numbers" ("0", "1", "2") only information with the "tag number" "0" corresponding to the search data 0 is registered at this time.

Since the comparison condition is satisfied concerning the search data 0 as described above, the DMA chip 200 (the key-count reading unit 205) sets the "hit flag" at "1". Also, since the data search processing was performed using all the three descriptors belonging to the descriptor block, the DMA chip 200 (the descriptor control unit 204) sets the "last flag" at "1".

Further, the DMA chip 200 (the descriptor control unit 204) sets the "valid flag" at "1" to indicate the waiting state waiting for an execution of a processing in which the MPU 22 reads the data that satisfied the comparison condition from the cache memory 31A.

After performing the interruption processing to the MPU 22 (121), the DMA chip 200 starts a data search processing for a search data 1 without waiting for the completion of the processing in which the data that satisfied the comparison condition is read by the MPU 22.

Namely, the DMA chip 200 reads the descriptor 1 generated by the memory 21 (122). And then the DMA chip 200 reads the search data from the memory 21 based on the "memory address" specified by the descriptor ((123), (124)), and reads the search data from the cache memory 31A in the disc array unit 30 based on the "cache address" specified by the descriptor ((125), (126)).

The DMA chip 200 then makes a judgment of whether the result of comparison of the search data satisfies the comparison condition (Hit) or not (Miss) and notifies the judgment to the descriptor control unit 204.

When the result of comparison of the search data by the DMA chip 200 is "Miss", the DMA chip 200 reads a new descriptor belonging to the descriptor block corresponding to the search data 1 from the memory 21 (127).

The DMA chip 200 then reads the new search data from the cache memory 31A based on the "cache address" specified by the new descriptor ((128), (129)).

The DMA chip 200 compares the search data (130) from the memory 21 with the new search data from the cache memory 31A based on the comparison logic and repeats the similar processings to (127), (128), (129), (130) until the result of comparison "Hits" or all the results of comparison of the searched data using each descriptor belonging to the descriptor "Misses".

When it is judged that the result of comparison of the search data "Hits", the DMA chip 200 updates the tag table stored in the tag-table storing unit 206 (131) and performs an interruption processing to the MPU 22 (132).

An updated tag table is shown in the middle of FIG. 17. It is assumed that, information with the "tag number" "0" corresponding to the search data 0 and information with the "tag number" "1" corresponding to the search data 1 is registered at this time.

In this example, since the data reading processing by the MPU 22 in association with the search data 0 is not completed, the "valid flag" corresponding to the "tag number" "0" remains "1".

Since the comparison condition is satisfied for the search data 1 as described above, the DMA chip 200 sets the "hit flag" at "1". Also, since the comparison condition is satisfied for the second of the three descriptors belonging to the descriptor block, the DMA chip 200 does not change the "last flag" from "0".

Also, the DMA chip 200 sets the "valid flag" at "1" to indicate the waiting state waiting for an execution of the processing in which the MPU 22 reads the data that satisfied the comparison condition from the cache memory 31A.

After performing the interruption processing to the MPU 22 (132), the DMA chip 200 starts a data search processing for a search data 2 without waiting for the completion of the processing in which the data that satisfied the comparison condition is read by the MPU 22.

Namely, the DMA chip 200 reads the descriptor 2 generated by the memory 21 (133). And then the DMA chip 200 reads the search data from the memory 21 based on the "memory address" specified by the descriptor ((134), (135)), and reads the search data from the cache memory 31A in the disc array unit 30 based on the "cache address" specified by the descriptor ((136), (137)).

The DMA chip 200 then makes a judgment of whether the result of comparison of the search data satisfies the comparison condition (Hit) or not (Miss) and notifies the judgment to the descriptor control unit 204.

When the result of comparison of the search data by the DMA chip 200 is "Miss", the DMA chip 200 reads a new descriptor belonging to the descriptor block corresponding to the search data 2 from the memory 21 (138).

The DMA chip 200 then reads the new search data from the cache memory 31A based on the "cache address" specified by the new descriptor ((139), (140)).

The DMA chip 200 compares the search data (141) from the memory 21 with the new search data from the cache memory 31A based on the comparison logic and repeats the similar processings to (138), (139), (140), (141) until the result of comparison "Hits" or all the results of comparison of the searched data using each descriptor belonging to the descriptor "Misses".

When it is judged that all of the result of comparison of the search data "Missed", the DMA chip 200 updates the tag table stored in the tag-table storing unit 206 (146) and performs an interruption processing to the MPU 22 (147).

An updated tag table is shown at the bottom of FIG. 17. At this time, the tag table shows information with the "tag number" "0" corresponding to the search data 0, information with the "tag number" "1" corresponding to the search data 1, and information with the "tag number" "2" corresponding to the search data 2.

In this example, since the data reading processing by the MPU 22 in association with the search data 0 is completed, the "valid flag" corresponding to the "tag number" "0" is updated to "0". Also, since the data reading processing by the MPU 22 in association with the search data 1 is not completed, the "valid flag" corresponding to the "tag number" "1" remains "1".

Since the comparison condition is not satisfied for the search data 2 as described above, the DMA chip 200 sets the "error flag" at "1". Also, since the data search processing is performed using all of the three descriptors belonging to the descriptor block, the DMA chip 200 sets the "last flag" at "1".

Also, the DMA chip 200 sets the "valid flag" at "1" to indicate the waiting state waiting for an execution of a processing in which the information corresponding to the "tag number" "2" is cleared.

As described above, according to the third embodiment, since the DMA chip 200 stores a plurality of pieces of information concerning the state of processing of searching for a data corresponding to the search data transmitted from the descriptor and the host computer 40A in the tag table with respect to each data search processing, the MPU 22 makes a request for data transfer corresponding to the search data transmitted from the descriptor and the host computer 40A based on the information of the processing state stored in the tag table, and the DMA chip 200 transfers the data to the host computer 40A when the MPU 22 makes the request for data transfer, storing the plurality of pieces of information concerning the processing state with respect to each data search processing enables the DMA chip 200 to perform the data search processing in succession without waiting for the data processing by the MPU 22, and to perform the data search processing independently while the MPU 22 is performing another processing, so as to suppress the overhead of the MPU22.

Furthermore, according to the third embodiment, since the descriptor includes information concerning the tag number identifying each search data transmitted by the host computer 40A, and the information concerning the state of the search processing stored as the tag table includes the tag number and the information concerning the state of the data search processing corresponding to the tag number, the information concerning the processing state can be easily identified by adding the tag number information to the descriptor and by managing the information concerning the processing state using the tag number, even when the search processing for the search data is performed more than once continuously.

According to the present invention, it is not necessary to generate and transmit once each a plurality of information for searching stored data every time the data is compared. Therefore, it is possible to reduce a load during a data search. This enables to perform the data search rapidly and to transfer data efficiently.

Furthermore, according to the present invention, the stored data includes information about data length of comparison data and data length of a predetermined field in the stored data. This enables to perform the data search in detail.

Moreover, according to the present invention, stored data in a data storing memory is read from a cache memory that stores temporarily the stored data in the data storing memory. This enables to read the stored data rapidly.

Furthermore, according to the present invention, stored-data reading information includes a cache memory address of the stored data. This enables to search the stored data easily based on the cache memory address.

Moreover, according to the present invention, a buffer for storing temporarily the stored data in the data storing memory upon reading, is provided. This enables to read the next stored data after reading the stored data that is stored temporarily. Therefore, there is no need for reading of data by a bus with the high transmission speed to wait for reading of data by a bus with the low transmission speed. This enables to perform the data search rapidly and to transfer the data efficiently.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data transfer apparatus that is connected to a data storing memory that stores a plurality of data as a plurality of stored data, the data transfer apparatus receiving comparison data to be compared with the stored data from an external unit, searching data corresponding to the comparison data from among the stored data, and transferring the searched stored-data to the external unit, the data transfer apparatus comprising:

a comparison-data storing unit that stores the comparison data received;

a control unit that generates a plurality of pieces of comparison-condition information for searching predetermined stored data from the data storing memory before the comparison data is read from the comparison-data storing unit and the stored data is read from the data storing memory, each of the pieces of comparison-condition information including a comparison-data address related to an address at which the comparison data is stored in the comparison-data storing unit and a stored-data address related to an address at which the stored data is stored in the data storing memory, the stored data being compared with the comparison data; and a transfer processing unit that transfers the searched stored-data to the external unit, the transfer processing unit including a comparison-data reading function of reading the comparison data from the comparison-data storing unit based on the comparison-data address included in the comparison-condition information;

a stored-data reading function of reading the stored data from the data storing memory based on the stored-data address included in the comparison-condition information; and a stored-data searching function of searching the stored data corresponding to the comparison-condition information and the comparison data by comparing the stored data read with the comparison data read based on the comparison-condition information.

2. The data transfer apparatus according to claim 1, wherein each of the stored data is described in a variable-length data format that includes a predetermined data block for comparing with the comparison data, and the comparison-condition information includes information related to a data length of the comparison data to be compared, and to a data length of a predetermined field in the stored data.

3. The data transfer apparatus according to claim 1, wherein the data storing memory includes a cache memory that temporarily stores the stored data, and the stored-data reading function is engaged with the transfer processing unit, and reads the stored data from the cache memory, based on the stored-data address.

4. The data transfer apparatus according to claim 1, wherein the data storing memory includes a cache memory, the comparison-condition information includes a cache-memory address related to an address at which the stored data is stored in the cache memory as the stored-data address, and the stored-data reading function reads the stored data from the cache memory based on the cache-memory address.

5. The data transfer apparatus according to claim 1, further comprising:

a data-transfer requesting unit that makes a request for transferring the stored data corresponding to the comparison-condition information and the comparison data, wherein the transfer processing unit further includes a search-result storing function of storing a plurality of pieces of information concerning a processing state of searching the stored data corresponding to the comparison-condition information and the comparison data with respect to each stored-data searching processing, the data-transfer requesting unit makes the request based on the information concerning the processing state, and the transfer processing unit transfers the stored data corresponding to the comparison-condition information and the comparison data to the external unit when the data-transfer requesting unit makes the request.

6. The data transfer apparatus according to claim 5, wherein the comparison-condition information includes identification information for uniquely identifying each comparison data, and the information concerning the processing state includes the identification information and information concerning a state of searching the stored data corresponding to the identification information.

7. The data transfer apparatus according to claim 1, wherein the comparison-data reading function includes a comparison-data storing buffer that reads the comparison data from the comparison-data storing unit, temporarily stores the comparison data read, and when the comparison data temporarily stored is read by the stored-data searching function, reads next comparison data from the comparison-data storing unit, and temporarily stores the next comparison data read, and the stored-data reading function includes a stored-data storing buffer that reads the stored data from the data storing memory, temporarily stores the stored data read, and when the stored data temporarily stored is read by the stored-data searching function, reads next stored data from the data storing memory, and temporarily stores the next stored data read.

8. A data transfer method for a data transfer apparatus that is connected to a data storing memory that stores a plurality of data as a plurality of stored data, the data transfer apparatus receiving comparison data to be compared with the stored data from an external unit, searching data corresponding to the comparison data from among the stored data, and transferring the searched stored-data to the external unit, the data transfer method comprising:

storing the comparison data received in a first memory;

generating a plurality of pieces of comparison-condition information for searching predetermined stored data from the data storing memory before the comparison data is read from the comparison-data storing unit and the stored data is read from the data storing memory, each of the pieces of comparison-condition information including a comparison-data address related to an address at which the comparison data is stored in the first memory and a stored-data address related to an address at which the stored data is stored in the data storing memory, the stored data being compared with the comparison data;

reading the comparison data from the first memory based on the comparison-data address included in the comparison-condition information;

reading the stored data from the data storing memory based on the stored-data address included in the comparison-condition information;

searching the stored data corresponding to the comparison-condition information and the comparison data by comparing the stored data read with the comparison data read based on the comparison-condition information; and transferring the searched stored-data to the external unit.

9. The data transfer method according to claim 8, wherein each of the stored data is described in a variable-length data format that includes a predetermined data block for comparing with the comparison data, and the comparison-condition information includes information related to a data length of the comparison data to be compared, and to a data length of a predetermined field in the stored data.

10. The data transfer method according to claim 8, wherein the reading the stored data includes reading the stored data from a cache memory that temporarily stores the stored data, based on the stored-data address.

11. The data transfer method according to claim 8, wherein the data storing memory includes a cache memory, the comparison-condition information includes a cache-memory address related to an address at which the stored data is stored in the cache memory as the stored-data address, and the reading the stored data includes reading the stored data from the cache memory based on the cache-memory address.

12. The data transfer method according to claim 8, further comprising:

making a request for transferring the stored data corresponding to the comparison-condition information and the comparison data, wherein the searching includes storing a plurality of pieces of information concerning a processing state of searching the stored data corresponding to the comparison-condition information and the comparison data with respect to each stored-data searching processing, the making includes making the request for transferring the stored data corresponding to the comparison-condition information and the comparison data based on the information concerning the processing state, and the transferring includes transferring the stored data corresponding to the comparison-condition information and the comparison data to the external unit when the request is made.

13. The data transfer method according to claim 12, wherein the comparison-condition information includes identification information for uniquely identifying each comparison data, and the information concerning the processing state includes the identification information and information concerning a state of searching the stored data corresponding to the identification information.

14. The data transfer method according to claim 8, wherein the reading the comparison data includes reading the comparison data from the first memory;

storing temporarily the comparison data read in a first buffer;

reading, when the comparison data temporarily stored is read, next comparison data from the first memory; and storing temporarily the next comparison data read in the first buffer, and the reading the stored data includes reading the stored data from the data storing memory;

storing temporarily the stored data read in a second buffer;

reading, when the stored data temporarily stored is read, next stored data from the data storing memory; and storing temporarily the next stored data read in the second buffer.

15. A data transfer apparatus that is connected to a data storing memory that stores a plurality of data as a plurality of stored data, the data transfer apparatus receiving comparison data to be compared with the stored data from an external unit, searching data corresponding to the comparison data from among the stored data, and transferring the searched stored-data to the external unit, the data transfer apparatus comprising:

a control unit that generates a plurality of pieces of comparison-condition information for searching predetermined stored data from the data storing memory;

a comparison-data storing unit that stores the comparison data received;

a data-transfer requesting unit that makes a request for transferring the stored data corresponding to the comparison-condition information and the comparison data; and a transfer processing unit that transfers the searched stored-data to the external unit, the transfer processing unit including a comparison-data reading function of reading the comparison data from the comparison-data storing unit based on the comparison-condition information;

a stored-data reading function of reading the stored data from the data storing memory based on the comparison-condition information;

a stored-data searching function of searching the stored data corresponding to the comparison-condition information and the comparison data by comparing the stored data read with the comparison data read based on the comparison-condition information, a search-result storing function of storing a plurality of pieces of information concerning a processing state of searching the stored data corresponding to the comparison-condition information and the comparison data with respect to each stored-data searching processing, wherein the data-transfer requesting unit makes the request based on the information concerning the processing state, and the transfer processing unit transfers the stored data corresponding to the comparison-condition information and the comparison data to the external unit when the data-transfer requesting unit makes the request.

16. The data transfer apparatus according to claim 15, wherein the comparison-condition information includes identification information for uniquely identifying each comparison data, and the information concerning the processing state includes the identification information and information concerning a state of searching the stored data corresponding to the identification information.

17. A data transfer method for a data transfer apparatus that is connected to a data storing memory that stores a plurality of data as a plurality of stored data, the data transfer apparatus receiving comparison data to be compared with the stored data from an external unit, searching data corresponding to the comparison data from among the stored data, and transferring the searched stored-data to the external unit, the data transfer method comprising:

storing the comparison data received in a first memory;
   generating a plurality of pieces of comparison-condition information for searching predetermined stored data from the data storing memory;
   making a request for transferring the stored data corresponding to the comparison-condition information and the comparison data;
   reading the comparison data from the first memory based on the comparison-condition information;
   reading the stored data from the data storing memory based on the comparison-condition information;
   searching the stored data corresponding to the comparison-condition information and the comparison data by comparing the stored data read with the comparison data read based on the comparison-condition information; and
   transferring the searched stored-data to the external unit, wherein
   the searching includes storing a plurality of pieces of information concerning a processing state of searching the stored data corresponding to the comparison-condition information and the comparison data with respect to each stored-data searching processing,
   the making includes making the request for transferring the stored data corresponding to the comparison-condition information and the comparison data based on the information concerning the processing state, and
   the transferring includes transferring the stored data corresponding to the comparison-condition information and the comparison data to the external unit when the request is made.

18. The data transfer method according to claim 17, wherein
   the comparison-condition information includes identification information for uniquely identifying each comparison data, and
   the information concerning the processing state includes the identification information and information concerning a state of searching the stored data corresponding to the identification information.

* * * * *